(12) United States Patent
Kadowaki

(10) Patent No.: US 7,477,787 B2
(45) Date of Patent: Jan. 13, 2009

(54) IMAGE COMPRESSION DEVICE AND METHOD

(75) Inventor: Yukio Kadowaki, Nara (JP)

(73) Assignee: Ricoh Company, Ltd, Tokyo (JP)

( * ) Notice: Subject to any disclaimer, the term of this patent is extended or adjusted under 35 U.S.C. 154(b) by 585 days.

(21) Appl. No.: 10/549,823

(22) PCT Filed: Mar. 23, 2004

(86) PCT No.: PCT/JP2004/003970

§ 371 (c)(1),
(2), (4) Date: Sep. 20, 2005

(87) PCT Pub. No.: WO2004/088973

PCT Pub. Date: Oct. 14, 2004

(65) Prior Publication Data

US 2006/0228028 A1    Oct. 12, 2006

(30) Foreign Application Priority Data

Mar. 28, 2003   (JP)   ............................. 2003-091307

(51) Int. Cl.
G06K 9/36   (2006.01)
(52) U.S. Cl. ..................................... 382/232
(58) Field of Classification Search ................ 382/232, 382/236, 238, 248, 250; 375/240, 240.02, 375/240.11, 240.18–240.21; 348/348.1, 348/395.1, 398.1, 403.1, 426.13–426.14; 708/317, 400–401
See application file for complete search history.

(56) References Cited

U.S. PATENT DOCUMENTS 5,721,791 A * 2/1998 Maeda et al. ............... 382/253

6,101,279 A * 8/2000 Nguyen et al. .............. 382/240

(Continued)

FOREIGN PATENT DOCUMENTS

EP    1158773 A2    11/2001

(Continued)

OTHER PUBLICATIONS

Ikuro Ueno, et al., "An overview of the new international standard (JPEG 2000) for coding still images", The Journal of the Institute of Image Information and Television Engineers, pp. 164-171, vol. 54, No. 2, 2000.

(Continued)

Primary Examiner—Jose L Couso
(74) Attorney, Agent, or Firm—Cooper and Dunham, LLP

(57) ABSTRACT

An image compression device is disclosed that is capable of quickly compressing image data to a target value by a simple configuration while maintaining quality of a reproduced image as much as possible. The image compression device includes an encoding part, a code reduction part, and a processing part. The encoding part performs a frequency analysis for original image data, encodes the coefficients generated by the frequency analysis first unit by first unit, and generates a series of codes. The code reduction part reduces the amount of the codes of each of the first units. The processing part divides the coefficients or the codes of each of the first units into second units, and increases the amount of codes to be reduced in the code reduction part for each of the second units according to values of the coefficients or the codes of each of the second units.

24 Claims, 18 Drawing Sheets

U.S. PATENT DOCUMENTS

| | | |
|---|---|---|
| 6,614,939 B1 | 9/2003 | Yamauchi |
| 6,792,057 B2 * | 9/2004 | Kabel et al. ............... 375/346 |
| 7,006,568 B1 * | 2/2006 | Gu et al. ............... 375/240.11 |
| 7,305,139 B2 * | 12/2007 | Srinivasan et al. ......... 382/248 |
| 2003/0081847 A1 | 5/2003 | Sato |

FOREIGN PATENT DOCUMENTS

| | | | |
|---|---|---|---|
| EP | 1158774 | A2 | 11/2001 |
| JP | 2004-56605 | | 2/2004 |

OTHER PUBLICATIONS

European Search Report in connection with European Application EP 04 72 2701.

Masuzaki T et al. "Adaptive rate control for JPEG2000 image coding in embedded systems".

* cited by examiner

FIG.2

| T | Y 3LL, 3HL-LH-HH,<br>2HL-LH-HH, 1HL-LH-HH<br>Cb 3LL, 3HL-LH-HH<br>2HL-LH-HH, 1HL-LH-HH<br>Cr 3LL, 3HL-LH-HH<br>2HL-LH-HH, 1HL-LH-HH | T | Y 3LL, 3HL-LH-HH,<br>2HL-LH-HH, 1HL-LH-HH<br>Cb 3LL, 3HL-LH-HH<br>2HL-LH-HH, 1HL-LH-HH<br>Cr 3LL, 3HL-LH-HH<br>2HL-LH-HH, 1HL-LH-HH |
|---|---|---|---|
| T=0 | 0, 0 0 0, 0 0 0, 0 0 0<br>0, 0 0 0, 0 0 0, 0 0 1<br>0, 0 0 0, 0 0 0, 0 0 0 | T=399 | 1, 1 1 3, 4 4 6, 10 10 17<br>9, 10 10 13, 14 14 18, 20 20 27<br>8, 9 9 11, 12 12 16, 18 18 23 |
| T=1 | 0, 0 0 0, 0 0 0, 0 0 0<br>0, 0 0 0, 0 0 0, 0 0 2<br>0, 0 0 0, 0 0 0, 0 0 0 | T=400 | 1, 1 1 3, 4 4 6, 10 10 17<br>9, 10 10 13, 14 14 18, 20 20 27<br>8, 9 9 11, 12 12 16, 18 18 23 |
| T=2 | 0, 0 0 0, 0 0 0, 0 0 0<br>0, 0 0 0, 0 0 0, 0 0 3<br>0, 0 0 0, 0 0 0, 0 0 0 | ⋮ | ⋮ |
| ⋮ | ⋮ | T=499 | |
| T=99 | 0, 0 0 0, 0 0 0, 0 0 6<br>0, 0 0 3, 4 4 8, 10 10 17<br>0, 0 0 1, 2 2 6, 7 7 13 | T=500 | |
| T=100 | 0, 0 0 0, 0 0 0, 0 0 7<br>0, 0 0 3, 4 4 8, 10 10 17<br>0, 0 0 1, 2 2 6, 7 7 13 | ⋮ | ⋮ |
| ⋮ | ⋮ | T=1000 | |
| T=199 | 0, 0 0 0, 0 0 0, 5 5 11<br>3, 4 4 7, 8 8 13, 15 15 21<br>2, 3 3 6, 7 7 10, 12 12 17 | ⋮ | ⋮ |
| T=200 | 0, 0 0 0, 0 0 0, 5 5 11<br>3, 4 4 7, 8 8 13, 15 15 22<br>2, 3 3 6, 7 7 10, 12 12 17 | T=1500 | |
| ⋮ | ⋮ | ⋮ | ⋮ |
| T=299 | 0, 0 0 0, 1 1 4, 8 8 14<br>6, 7 7 10, 11 12 16, 18 18 25<br>6, 6 6 9, 10 10 13, 15 15 20 | ⋮ | ⋮ |
| T=300 | 0, 0 0 0, 1 1 4, 8 8 14<br>6, 7 7 10, 12 12 16, 18 18 25<br>6, 6 6 9, 10 10 13, 15 15 20 | ⋮ | ⋮ |
| ⋮ | ⋮ | ⋮ | ⋮ |

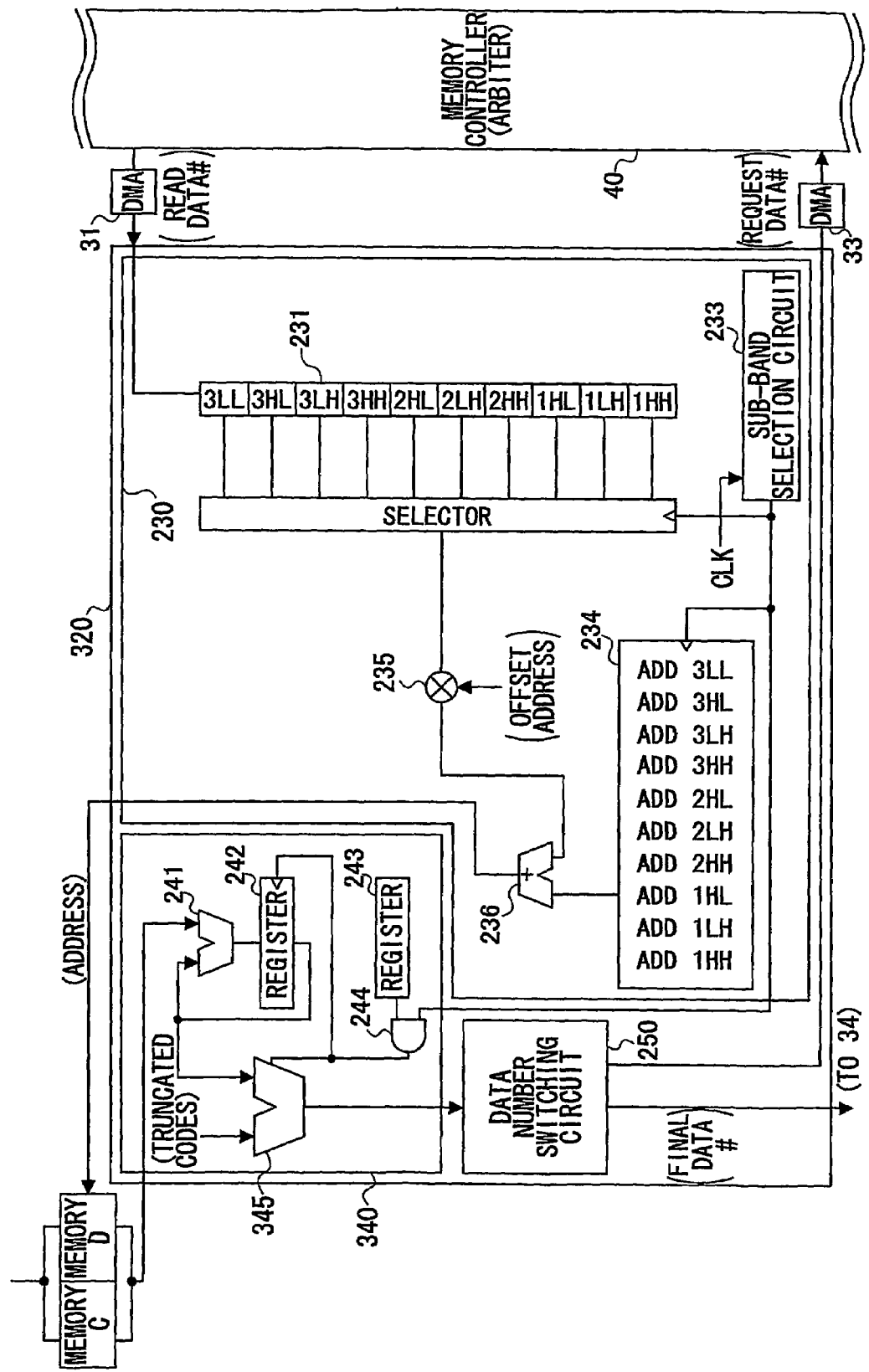

IMAGE COMPRESSION DEVICE AND METHOD

TECHNICAL FIELD

This disclosure relates to an image compression device for encoding image data according to the JPEG 2000 standard or others, and a method thereof.

BACKGROUND ART

In the recent years, the JPEG 2000 standard has become a well known method especially for compressing and encoding high definition images. When encoding an image according to the JPEG 2000 algorithm, original image data are transformed into a number of color components, for example, into Y, Cb, and Cr color components. Two-dimensional discrete wavelet transformation (2D-DWT) is carried out on data of each color component to perform frequency analysis, and this transformation produces wavelet coefficients, each of which is represented by, for example, 16-bit data. The thus obtained wavelet coefficients are divided into sub-bands, which are units of processing. For example, in wavelet transformation at level three, there are sub-bands 3LL, 3HL, 3LH, 3HH, 2HL, 2LH, 2HH, 1HL, 1LH, and 1HH. In each sub-band, the wavelet coefficients are divided into bit-planes. In each sub-band, the wavelet coefficients contained in the bit-planes are scanned from the most significant bit (MSB) to the least significant bit (LSB) through three types of coding passes, and then encoding is performed by arithmetic coding. The three types of coding passes are referred to as "significant propagation pass", "magnitude refinement pass", and "cleanup pass".

Compression of the codes are achieved by successively and uniformly truncating the codes, obtained by scanning through the above three passes, of a coding pass through all code blocks in each sub-band sequentially from the bit-planes of the least significant bits. Here, the term "truncating" means to set a target bit to zero, which indicates invalid data. The coding method of the JPEG 2000 algorithm is described in detail in "Overview of the new international standards (JPEG 2000) for coding of still images", The Journal of the Institute of Image Information and Television Engineers, pp 164-171, Vol. 54, No. 2, 2000.

In the coding process of JPEG 2000, as described above, image data can be easily compressed to a preset target value by successively truncating the codes of a coding pass corresponding to the bit-planes of the least significant bits in each sub-band. However, depending on the method of truncating, sometimes the quality of the reproduced image, which is the image obtained by decoding the compressed codes, may be greatly degraded.

SUMMARY

In an aspect of this disclosure, an image compression device and image compression method are provided which are capable of quickly compressing image data to a target value by a simple configuration while maintaining quality of a reproduced image as much as possible.

According to another aspect of this disclosure, there is provided an image compression device comprising an encoding part that performs a frequency analysis on image data, encodes a plurality of coefficients generated by the frequency analysis first unit by first unit, and generates a plurality of codes; a code reduction part that reduces the amount of the codes of each of the first units; and a processing part that further divides the coefficients or the codes of each of the first units into a plurality of second units, and increases the amount of code reduction in the code reduction part for each of the second units according to values of the coefficients of each of the second units or according to values of the codes of each of the second units.

In an embodiment, the code reduction part comprises a truncation table including a plurality of truncation data sets to each of which a data number is assigned, said truncation data sets determining the amount of codes to be truncated from the least significant bit of the codes corresponding to one of the coefficients in each of the first units, said truncation data sets being arranged so that along with an increase of the data number, the amount of the codes to be truncated increases or decreases gradually, and the image quality degrades or improves gradually; and a rate controller that determines one of the data numbers corresponding to one of the truncation data, said one of the truncation data sets resulting in a change of the amount of the codes of each of the first units after code truncation in accordance with the one of the truncation data sets to be close to a target value.

In an embodiment, the image compression device performs coding in compliance with the JPEG 2000 standards. In the image compression device, the encoding part performs a two-dimensional discrete wavelet transformation on the image data and generates a plurality of wavelet coefficients, divides the wavelet coefficients into a plurality of sub-bands, performs arithmetic coding for the wavelet coefficients in each sub-band and generates a plurality of codes; the code reduction part reduces the amount of the codes by truncating a portion of the codes corresponding to one of the wavelet coefficients from the least significant bit of the codes in each of the sub-bands; and the processing part divides each of the sub-bands into a plurality of code blocks, and increases the amount of the codes to be truncated for each code block in the code reduction part according to values of the wavelet coefficients in each of the code blocks or according to values of data obtained by processing the wavelet coefficients of each of the code blocks.

In an embodiment, the processing part comprises an average value calculation circuit that calculates an average value of the wavelet coefficients of a plurality of effective pixels in each of the code blocks, or an average value of the data obtained by processing the wavelet coefficients of the effective pixels in each of the code blocks; and a masking coefficient calculation circuit that determines the increase of the amount of the codes to be truncated in each of the code blocks performed in the code reduction part according to the average value obtained in the average value calculation circuit.

In an embodiment, the average value calculation circuit quantizes the wavelet coefficients of the effective pixels in each of the code blocks, and calculates the average value of the data obtained by quantizing the wavelet coefficients.

In an embodiment, the average value calculation circuit encodes the wavelet coefficients of the effective pixels in each of the code blocks by arithmetic coding, and calculates the average value of data obtained by encoding the wavelet coefficients.

According to another aspect of this disclosure, there is provided an image compression method comprising the steps of performing a frequency analysis on image data, encoding a plurality of coefficients obtained by the frequency analysis first unit by first unit, and generating a plurality of codes; reducing the amount of the codes of each of the first units; and further dividing the coefficients or the codes of each of the first unit into a plurality of second units, and increasing the amount of reduction of the codes for each of the second units according to values of the coefficients of each of the second units or according to values of the codes of each of the second units.

According to another aspect of this disclosure, there is provided a program for compressing image data, comprising instructions for causing a computer to execute: a first step of performing a frequency analysis on the image data, encoding a plurality of coefficients obtained by the frequency analysis first unit by first unit, and generating a plurality of codes; a second step of reducing the amount of the codes of each of the first units; and a third step of further dividing the coefficients or the codes of each of the first units into a plurality of second units, and increasing the amount of code reduction for each of the second units according to values of the coefficients of each of the second units or according to values of the codes of each of the second units.

According to another aspect of this disclosure, there is provided a storage medium that stores a program for compressing image data and comprising instructions for causing a computer to execute: a first step of performing a frequency analysis on the image data, encoding a plurality of coefficients obtained by the frequency analysis first unit by first unit, and generating a plurality of codes; a second step of reducing the amount of the codes of each of the first units; and a third step of further dividing the coefficients or the codes of each of the first units into a plurality of second units, and increasing the amount of code reduction for each of the second units according to values of the coefficients of each of the second units or according to values of the codes of each of the second units.

BRIEF DESCRIPTION OF THE DRAWINGS

These and other aspects, features, and advantages of the present invention will become more apparent from the following detailed description of preferred embodiments given with reference to the accompanying drawings, in which:

FIG. 2 shows a table for explaining a method of code truncation according to the present embodiment;

FIG. 19 is a block diagram showing a configuration of the rate control circuit 320 of the image compression device 300 according to the third embodiment of the present invention.

BEST MODE FOR CARRYING OUT THE INVENTION

Below, preferred embodiments of the present invention are explained with reference to the accompanying drawings.

First Embodiment

1. General Description of Code Truncation

Figure 1A:
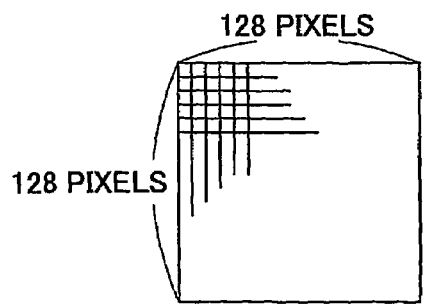
FIGS. 1A through 1C are diagrams for briefly explaining code truncation performed in an image compression device 100 according to a first embodiment of the present invention.
Figure 1B:
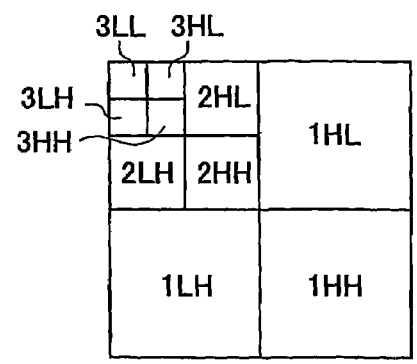
Figure 1C:
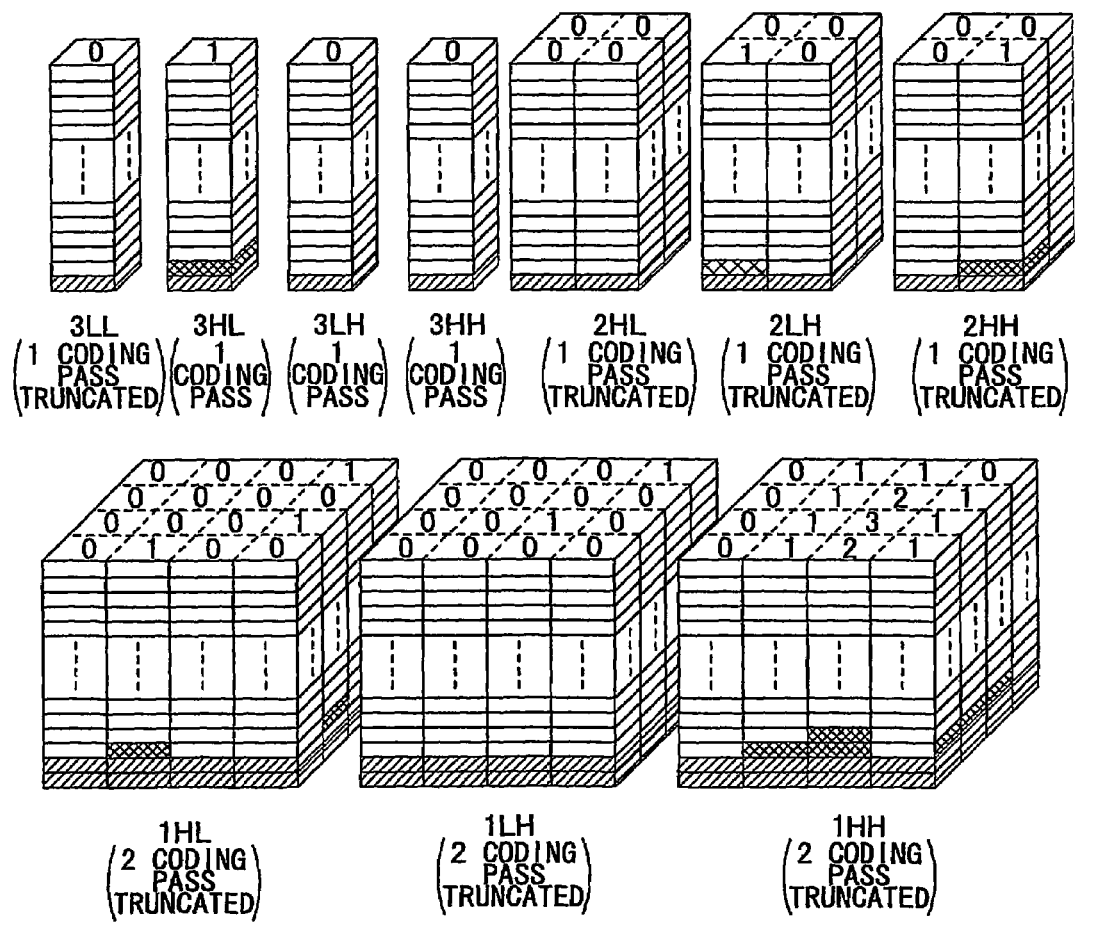

FIGS. 1A through 1C are diagrams for briefly explaining code truncation performed in an image compression device 100 according to a first embodiment of the present invention.

Below, for purpose of illustration, an explanation is made of coding of image data consisting of 128×128 pixels, as shown in FIG. 1A. First, the image data in FIG. 1A are transformed into a number of color components, for example, into Y, Cb, and Cr color components. Here, since the subsequent processing for different color components is the same, below, the description is made with the Y component as an example.

On the data of the Y color component, two-dimensional discrete wavelet transformation (2D-DWT) is carried out to perform frequency analysis, and this transformation generates 16-bit wavelet coefficients. To perform the subsequent processing with sub-bands as units, the wavelet coefficients are divided into groups respectively related to sub-bands 3LL, 3HL, 3LH, 3HH, 2HL, 2LH, 2HH, 1HL, 1LH, and 1HH, as shown in FIG. 1B. These wavelet coefficients are also divided into 16 bit-planes. In each sub-band, the 16-bit wavelet coefficients contained in the 16 bit-planes are scanned from the most significant bit to the least significant bit through three types of coding passes, and then encoding is performed by arithmetic coding. The three types of coding passes are the significant propagation pass, the magnitude refinement pass, and the cleanup pass. As a result, in each sub-band, codes of a total of 46 coding passes are generated. This is shown in FIG. 1C.

The image compression device 100 according to the first embodiment truncates the codes of a coding pass in each sub-band sequentially from the bit-plane of the least significant bit to the bit-plane of the most significant bit. There are two methods for such code truncation.

The first method is explained below with reference to FIG. 2.

In the first method of code truncation, first, a truncation table is prepared which contains data sets managed in terms of colors and sub-bands. Each data set in the truncation table determines the number of coding passes codes in which are to be truncated each time from the bit-plane of the least significant bit in each sub-band (3LL, 3HL, 3LH, 3HH, 2HL, 2LH, 2HH, 1HL, 1LH, and 1HH). Below, the data contained in the truncation table are referred to as "truncation data", and each data set contained in the truncation table is referred to as "truncation data set".

FIG. 2 shows an example of the truncation table according to the present embodiment. As shown in FIG. 2, the truncation table contains more than 1500 truncation data sets.

For example, a truncation data set 1, 1 1 1, 1 1 1, 2 2 2 is defined. This truncation data set, as illustrated by the dashed lines in FIG. 1C, specifies the number of coding passes, codes in which are to be truncated sequentially from the bit-plane of the least significant bit to the bit-plane of the most significant bit, each of the coding passes being through all of the code blocks in each sub-band, which is the unit of processing in arithmetic coding.

Specifically, the truncation data set 1, 1 1 1, 1 1 1, 2 2 2 specifies that codes of one coding pass are truncated from each of the sub-bands at level three: 3LL, 3HL, 3LH, and 3HH, codes of one coding pass are truncated from each of the sub-bands at level two: 2HL, 2LH, and 2HH, and codes of two coding passes are truncated from each of the sub-bands at level one: 1HL, 1LH, and 1HH.

In the truncation table of FIG. 2, the truncation data sets are arranged so that as the data number of the truncation data set increases, the data in the truncation data set increase accordingly, indicating that more codes are to be truncated, and as a result, leading to lower quality of the reproduced image.

Certainly, the truncation data sets may also be arranged so that as the data number increases, data in the corresponding truncation data set decrease accordingly, indicating that fewer codes are to be truncated, and as a result, leading to higher quality of the reproduced image. Such a truncation table and the corresponding processing are discussed below where necessary.

The truncation data are created based on experiments using sample images, or based on statistics of experimental results using various sample images. Moreover, a number of truncation tables may be prepared beforehand, and when capturing a moving image, the truncation table in use may be switched depending on the amount of movement of the object between successive frames.

In the image compression device 100 of the present embodiment, the codes of each coding pass in each sub-band, which are obtained by the arithmetic coding performed on data contained in the 16 bit-planes in each sub-band, are stored in a memory (memory A and memory B shown in FIG. 3), the amount of the codes to be truncated is calculated from the amount of codes stored in the memory, and the deficiency of the amount of codes to be truncated relative to a target value is obtained. If the calculated amount of codes to be truncated is less than the target value, a truncation data set corresponding to a larger data number may be selected, giving a greater amount of codes to be truncated. If the calculated amount of codes to be truncated is greater than the target value, a truncation data set corresponding to a larger data number may be selected, giving a lesser amount of codes to be truncated.

When compressing codes using the first method of code truncation, by preparing truncation data sets arranged in such an order that the amount of codes to be truncated increases as the data number increases, that is, the image quality decreases as the data number increases, it is not necessary to perform the process of decoding the codes after code truncation according to the JPEG 2000 algorithm and determine distortion relative to the image prior to the code truncation, to determine a way of code truncation resulting in the least distortion.

As described above, in the first method, codes of a specified number of coding passes, given by a truncation data set in the truncation table in each sub-band, are equally truncated.

Meanwhile, in the second method of code truncation, in comparison to the first method, each sub-band is further divided into a number of code blocks, which are used as the second unit for processing. In each code block, the number of coding passes to be truncated is increased by a number determined according to the magnitude of the wavelet coefficients, or magnitude of data obtained by processing the wavelet coefficients.

Generally, in the same sub-band, if the amount of codes to be truncated changes code block by code block, noticeable distortion occurs in the reproduced image at the boundaries between code blocks. For this reason, it is common to truncate codes sub-band by sub-band. In this embodiment, to solve the above problem, the second method is devised to be based on a characteristic of the human visual sense, that is, within a sub-band, particularly, in a region having more image components (an image component means an average value of wavelet coefficients of effective pixels, or an average value of data obtained by processing the wavelet coefficients of the effective pixels), even when a large amount of codes are truncated, a person does not perceive noticeable image distortion, and the person feels just moderate degradation of image quality. Therefore, by exploiting such a characteristic, it is possible to increase the rate of compression while maintaining the quality of the reproduced image as high as possible.

In detail, in each sub-band, the number of coding passes to be further truncated in each code block is determined according to an average value of the wavelet coefficients or an average value of data obtained by processing the wavelet coefficients of the effective pixels in the code block. For example, the number of coding passes to be further truncated in each code block is in the range from zero to two.

In FIG. 1C, each sub-band is divided into code blocks, which are marked off by dashed lines. The number of coding passes to be further truncated in each code block is presented in each code block, and the coding passes to be truncated are cross-hatched.

In this way, by adjusting the number of coding passes to be truncated in each code block, it is possible to perform code truncation more effectively while preventing degradation of quality of the reproduced image.

2. Configuration of Image Compression Device

Figure 3:
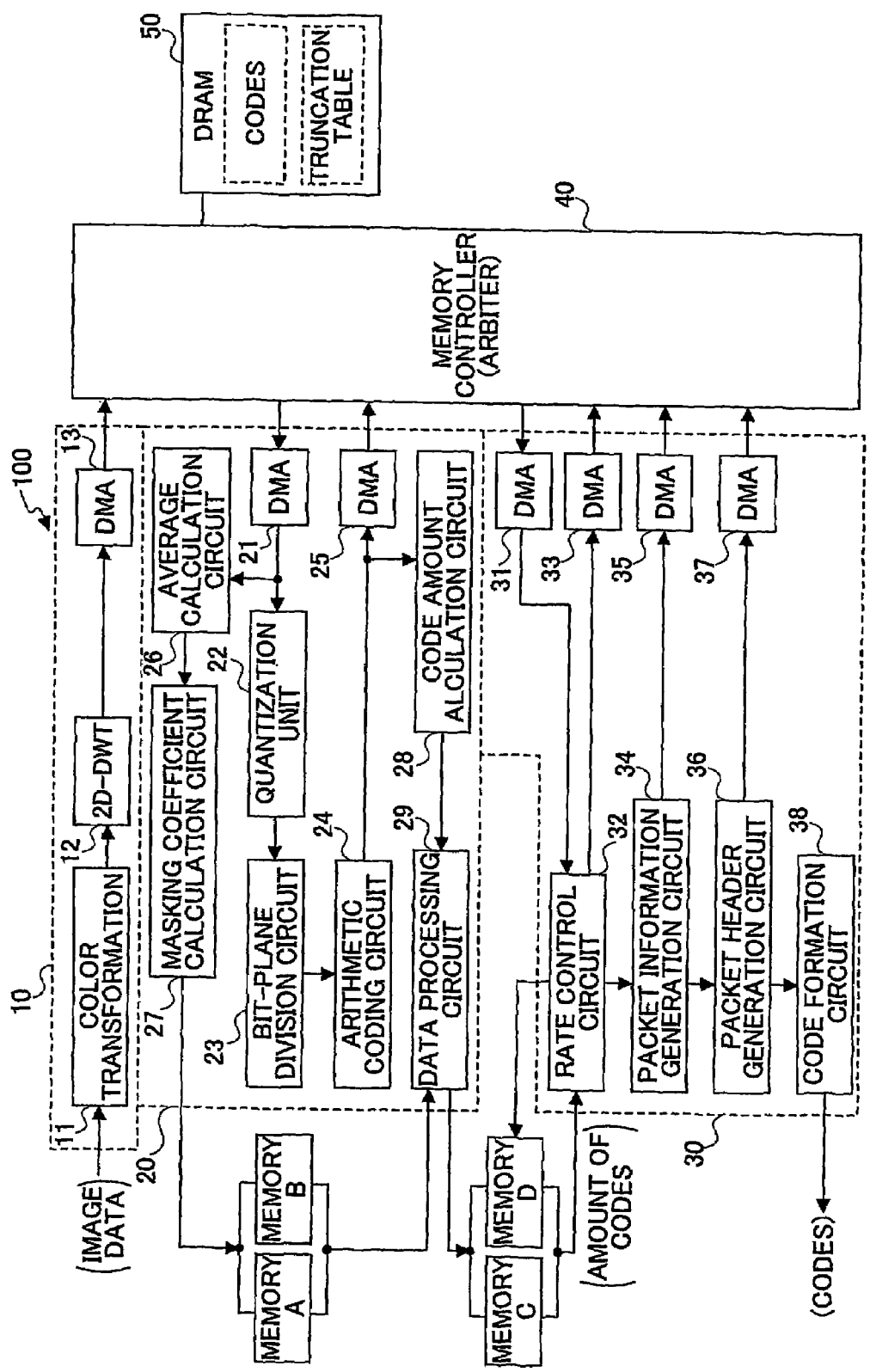
FIG. 3 is a block diagram showing a configuration of the image compression device 100 according to the first embodiment of the present invention.

FIG. 3 is a block diagram showing a configuration of an image compression device 100 according to a first embodiment of the present invention.

The image compression device 100 includes a wavelet transformation unit 10, an arithmetic coding unit 20, a packet header generation unit 30, a memory controller 40, and a DRAM 50.

The memory controller 40 is a so-called arbiter circuit, which arbitrates access to the DRAM 50 of DMA 13 in the wavelet transformation unit 10; DMA 21 and DMA 25 in the arithmetic coding unit 20; and DMAs 31, 33, 35 and 37 in the packet header generation unit 30.

The DRAM 50 holds the aforementioned truncation data shown in the truncation table presented in FIG. 2, and the codes of all sub-bands of an image frame that is being processed.

Next, configurations and operations of the wavelet transformation unit 10, the arithmetic coding unit 20, and the packet header generation unit 30 are explained below with reference to FIG. 4 through FIG. 12.

2.1 Wavelet Transformation Unit 10

The wavelet transformation unit 10 transforms input image data into 16-bit wavelet coefficients.

The wavelet transformation unit 10 includes a color transformation circuit 11, a wavelet transformation circuit 12, and the DMA 13.

The color transformation circuit 11 transforms the original image data into color components Y, Cb, and Cr, and output the data of the color components Y, Cb, and Cr.

The wavelet transformation circuit 12 carries out the two-dimensional discrete wavelet transformation (2D-DWT) on the data of each color component, and produces the 16-bit wavelet coefficients.

The DMA 13 transfers the thus obtained 16-bit wavelet coefficients to a specified address of the DRAM 50.

Here, well-known circuits are used for the color transformation circuit 11 and the wavelet transformation circuit 12.

2.2 Arithmetic Coding Unit 20

The arithmetic coding unit 20 includes DMA 21, a quantization unit 22, a bit-plane division circuit 23, an arithmetic coding circuit 24, DMA 25, an average calculation circuit 26, a masking coefficient calculation circuit 27, a code amount calculation circuit 28, and a data processing circuit 29.

The arithmetic coding unit 20 carries out arithmetic coding for the 16-bit wavelet coefficients stored in the DRAM 50, and loads the generated codes of each coding pass in each sub-band in the DRAM 50. Further, the arithmetic coding unit 20 determines the number of the coding passes in each code block in each sub-band, and loads the determined number of the coding passes in a memory A and a memory B. Below, "the number of the coding passes in each code block" is referred to as "number of masks" where necessary.

From the determined number of masks and the amount of codes of each coding pass in each code block, and based on the truncation data set, the arithmetic coding unit 20 determines the amount of code reduction when truncating one coding pass each time in each sub-band, and loads the obtained amount of the code reduction in a memory C and memory D. The obtained amount of the code reduction corresponds to the amount of codes that is to be further truncated according to the number of masks in each code block.

The DMA 21 reads out the 16-bit wavelet coefficients in each sub-band stored in the specified address of the DRAM 50.

The quantization unit 22 quantizes the obtained 16-bit wavelet coefficients by Entropy Quantization, and outputs the quantized wavelet coefficients to the bit-plane division circuit 23.

The bit-plane division circuit 23 divides the quantized wavelet coefficients into bit-planes.

The arithmetic coding circuit 24 scans the wavelet coefficients contained in the bit-planes in each sub-band from the most significant bit to the least significant bit in three types of coding passes, and then performs arithmetic coding. The three types of coding passes are the significant propagation pass, the magnitude refinement pass, and the cleanup pass, respectively. Codes output from the arithmetic coding circuit 24 contain codes of 46 coding passes (15×3+1=46). The arithmetic coding circuit 24 loads the codes in the DRAM 50 through the DMA 25.

Here, well-known circuits are used for the quantization unit 22, the bit-plane division circuit 23, and the arithmetic coding circuit 24.

Figure 4:
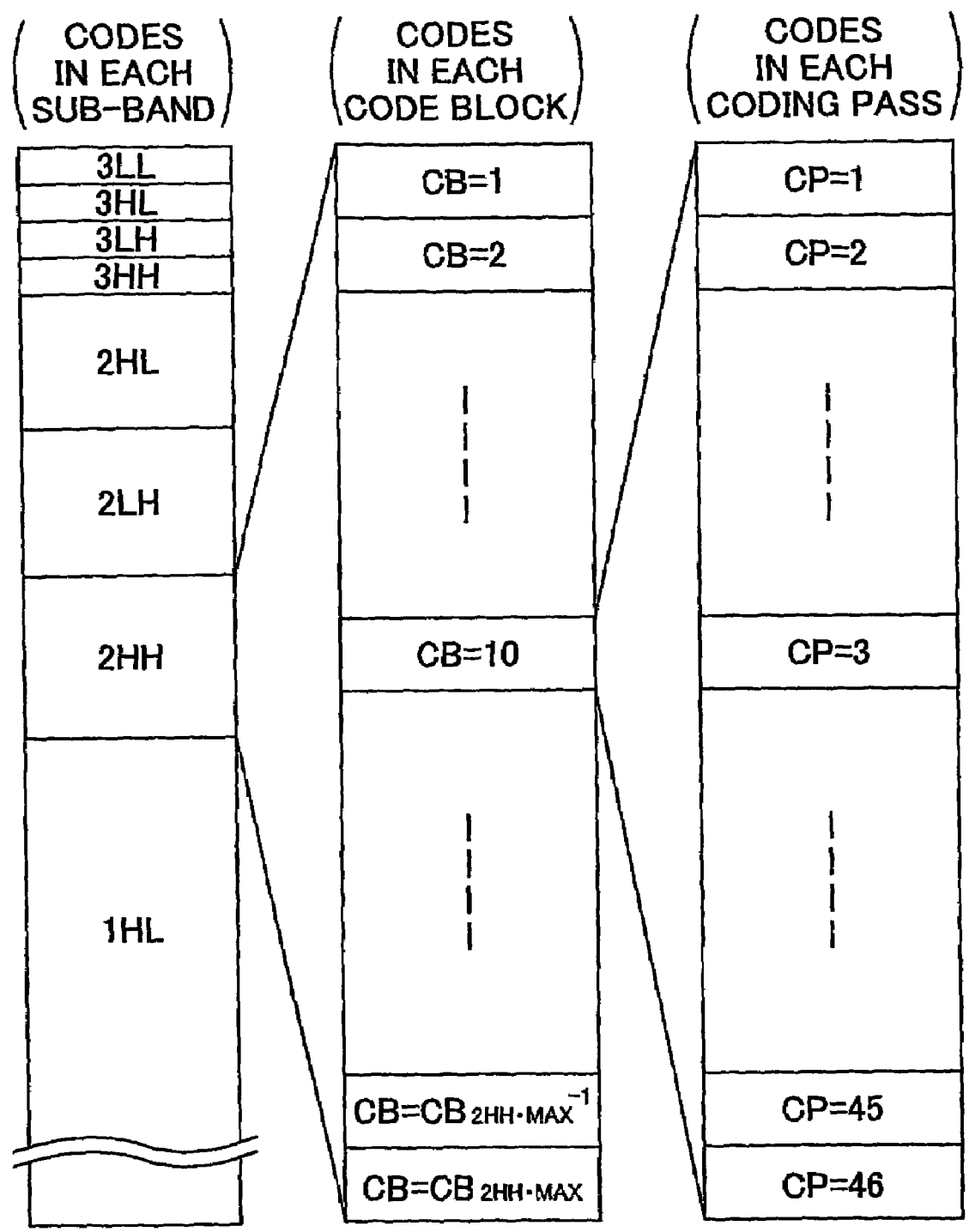
FIG. 4 is diagram showing a memory map of codes loaded in DRAM 50 of the image compression device 100 according to the first embodiment of the present invention.

FIG. 4 is diagram showing a memory map of the codes stored in DRAM 50.

The codes are loaded in the DRAM 50 in order of 3LL, 3HL, 3LH, 3HH, 2HL, 2LH, 2HH, 1HL, 1LH, and 1HH. For example, in the 2HH sub-band, codes of 46 coding passes are written in order of assigned code block numbers (CB), for example, 1, 2, . . . , 10, . . . , $CB_{2HH\text{-}MAX}$. Here, $CB_{2HH\text{-}MAX}$ represents a maximum number assigned to code blocks in the 2HH sub-band.

Referring to FIG. 3 again, the wavelet coefficients read out from the DRAM 50 through the DMA 21 are also output to the average calculation circuit 26. The average calculation circuit 26 calculates the average value of the wavelet coefficients of the effective pixels in each code block and then outputs the obtained results. Here, the effective pixel indicates a pixel having an effective wavelet coefficient in the code block formed by a certain pixel matrix.

Figure 5:
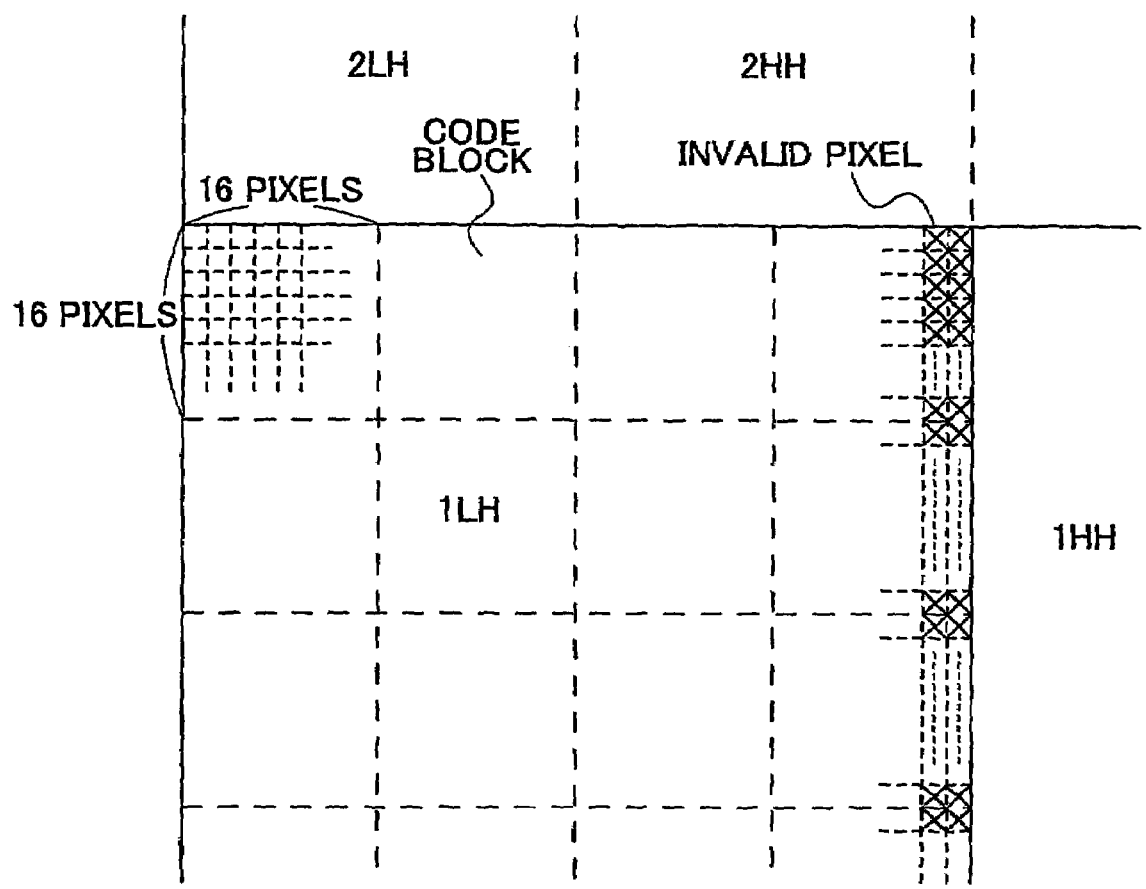
FIG. 5 is a diagram explaining the average value of the wavelet coefficients of the effective pixels in a code block according to the first embodiment of the present invention.

FIG. 5 is a diagram explaining the average value of the wavelet coefficients of the effective pixels in a code block.

As shown in FIG. 5, when the 1LH sub-band including 64 (vertical)×62 (horizontal) pixels is divided into code blocks each having 16×16 pixels, in the code blocks positioned along the right side in FIG. 5, the 16 (vertical)×2 (horizontal) pixels on the right side of these code blocks, each of which is marked by a cross ("x"), do not have effective wavelet coefficients. Therefore, for these code blocks along the right side, the average value of the wavelet coefficients is calculated by using the pixels not marked with crosses. Here, a well known circuit is used for the average calculation circuit 26.

The data input to the average calculation circuit 26 includes not only the wavelet coefficients of each code block, but also data obtained by processing the wavelet coefficients of each code block, for example, the data obtained by quantizing the wavelet coefficients of each code block in the quantization unit 22, or codes of each code block obtained by coding the wavelet coefficients of each code block in the arithmetic coding circuit 24.

Referring to FIG. 3 again, the masking coefficient calculation circuit 27 determines the number of masks (that is, number of coding passes to be truncated) based on the average value of the wavelet coefficients of the effective pixels in each code block output sequentially from the average calculation circuit 26. The number of masks, also referred to as "masking coefficient", is equal to 0, or 1, or 2, indicating the number of coding passes to be further truncated in each code block. The masking coefficient calculation circuit 27 outputs the number of masks to the memory A and memory B.

Figure 6:
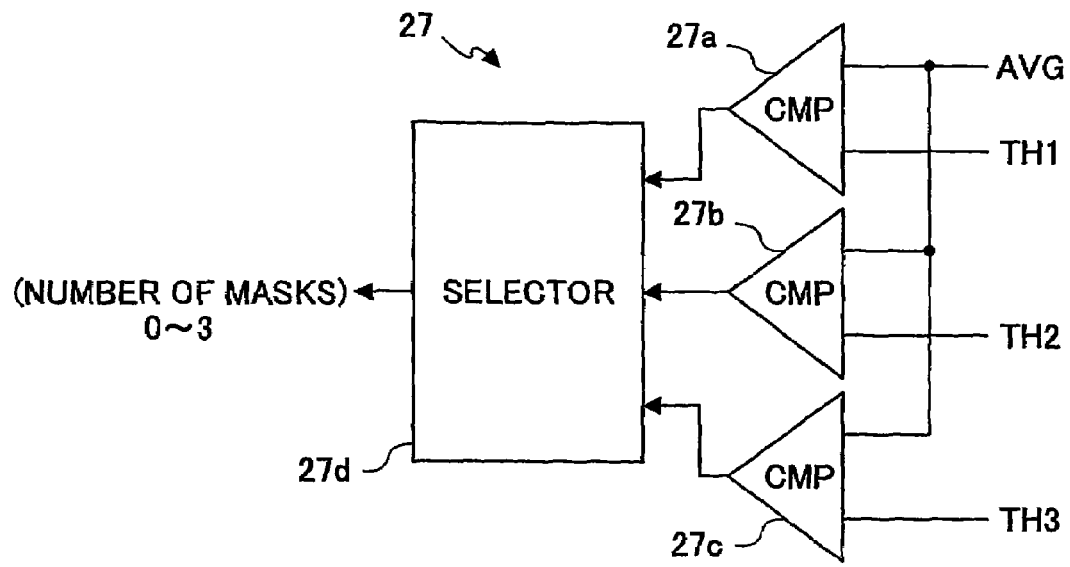
FIG. 6 is a circuit diagram showing a configuration of the masking coefficient calculation circuit 27 of the image compression device 100 according to the first embodiment of the present invention.

FIG. 6 is a circuit diagram showing a configuration of the masking coefficient calculation circuit 27.

As shown in FIG. 6, the masking coefficient calculation circuit 27 includes three comparators 27a, 27b, and 27c, and a selector 27d.

The average value of the wavelet coefficients of the effective pixels in each code block (denoted as AVG) is input to one input terminal of each of the comparators 27a, 27b, and 27c, and three threshold values (TH1, TH2, and TH3) are input to the other input terminals of the comparators 27a, 27b, and 27c, respectively. Here, it is assumed that the three thresholds TH1, TH2, and TH3 satisfy the relation of TH1<TH2<TH3.

When the data input to the comparator 27a is greater than the threshold TH1, the comparator 27a outputs a high level signal; when the data input to the comparator 27a is less than the threshold TH1, the comparator 27a outputs a low level signal. Similarly, when the data input to the comparator 27b is greater than the threshold TH2, the comparator 27b outputs a high level signal; when the data input to the comparator 27b is less than the threshold TH2, the comparator 27b outputs a low level signal. When the data input to the comparator 27c is greater than the threshold TH3, the comparator 27c outputs a high level signal; when the data input to the comparator 27c is less than the threshold TH3, the comparator 27c outputs a low level signal.

The selector 27d outputs the value of the number of masks. Specifically, when all of the comparator 27a, the comparator 27b, and the comparator 27c output low level signals, the selector 27d outputs a signal indicating the number of masks is zero; when the comparator 27a outputs a high level signal, and the comparator 27b and the comparator 27c output low level signals, the selector 27d outputs a signal indicating the number of masks is one; when the comparator 27a and the comparator 27b output high level signals, and the comparator 27c outputs a low level signal, the selector 27d outputs a signal indicating the number of masks is two; when all of the comparator 27a, the comparator 27b, and the comparator 27c output high level signals, the selector 27d outputs a signal indicating the number of masks is three.

Referring to FIG. 3 again, the memory A and the memory B are alternatively switched to an enabling state frame by frame to load the number of masks for each code block in each sub-band, which is output from the masking coefficient calculation circuit 27.

Figure 7:
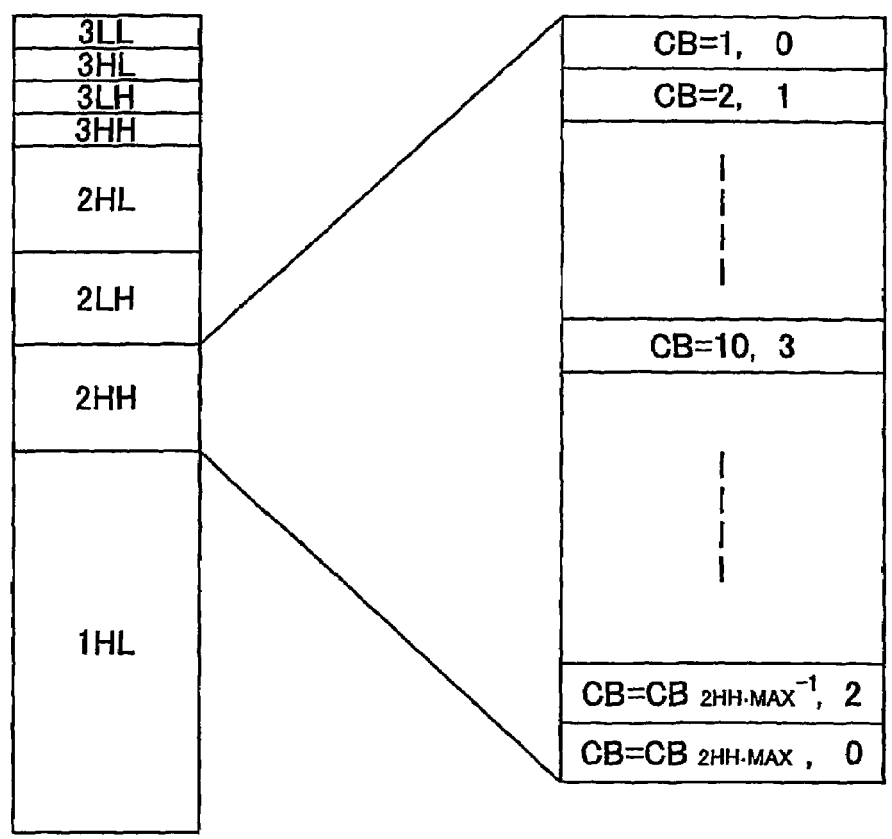
FIG. 7 is a diagram showing a memory map of the memory A of the image compression device 100 according to the first embodiment of the present invention.

FIG. 7 is a diagram showing a memory map of the memory A. The memory B has the same memory map as the memory A.

As shown in FIG. 7, in the memory A, there are loaded the numbers of masks of the code blocks in each of sub-bands 3LL, 3HL, 3LH, 3HH, 2HL, 2LH, 2HH, 1HL, 1LH, and 1HH. For example, in the 2HH sub-band, numbers of masks for code blocks from CB=1 through CB=$CB_{2HH\text{-}MAX}$ are stored. Specifically, for the code block having a code block number of 1, the numbers of masks is zero, for the code block having a code block number of 2, the numbers of masks is one, for the code block having a code block number of 10, the numbers of masks is three, for the code block having a code block number of $CB_{2HH\text{-}MAX\text{-}1}$, the numbers of masks is two, and for the code block having a code block number of $CB_{2HH\text{-}MAX}$, the numbers of masks is zero.

Here, as already mentioned above, $CB_{2HH\text{-}MAX}$ represents the maximum number assigned to code blocks in the 2HH sub-band. For example, $CB_{2HH\text{-}MAX}$ equals 16 in FIG. 7.

Referring to FIG. 3 again, the arithmetic coding circuit 24 also outputs codes to the code amount calculation circuit 28.

The code amount calculation circuit 28 counts the codes of each of the coding passes corresponding to the bit-planes in each sub-band, and outputs the count to the data processing circuit 29.

The numbers of masks of code blocks (numbers of coding passes of code blocks) loaded in the memory A and the memory B are also output to the data processing circuit 29.

When truncating the codes of the coding passes in each sub-band from the bit-plane of the least significant bit coding pass by coding pass, the data processing circuit 29 further calculates the amount of the codes truncated according to the number of masks, and loads the obtained amount of codes to be truncated in a memory C and a memory D.

Figure 8:
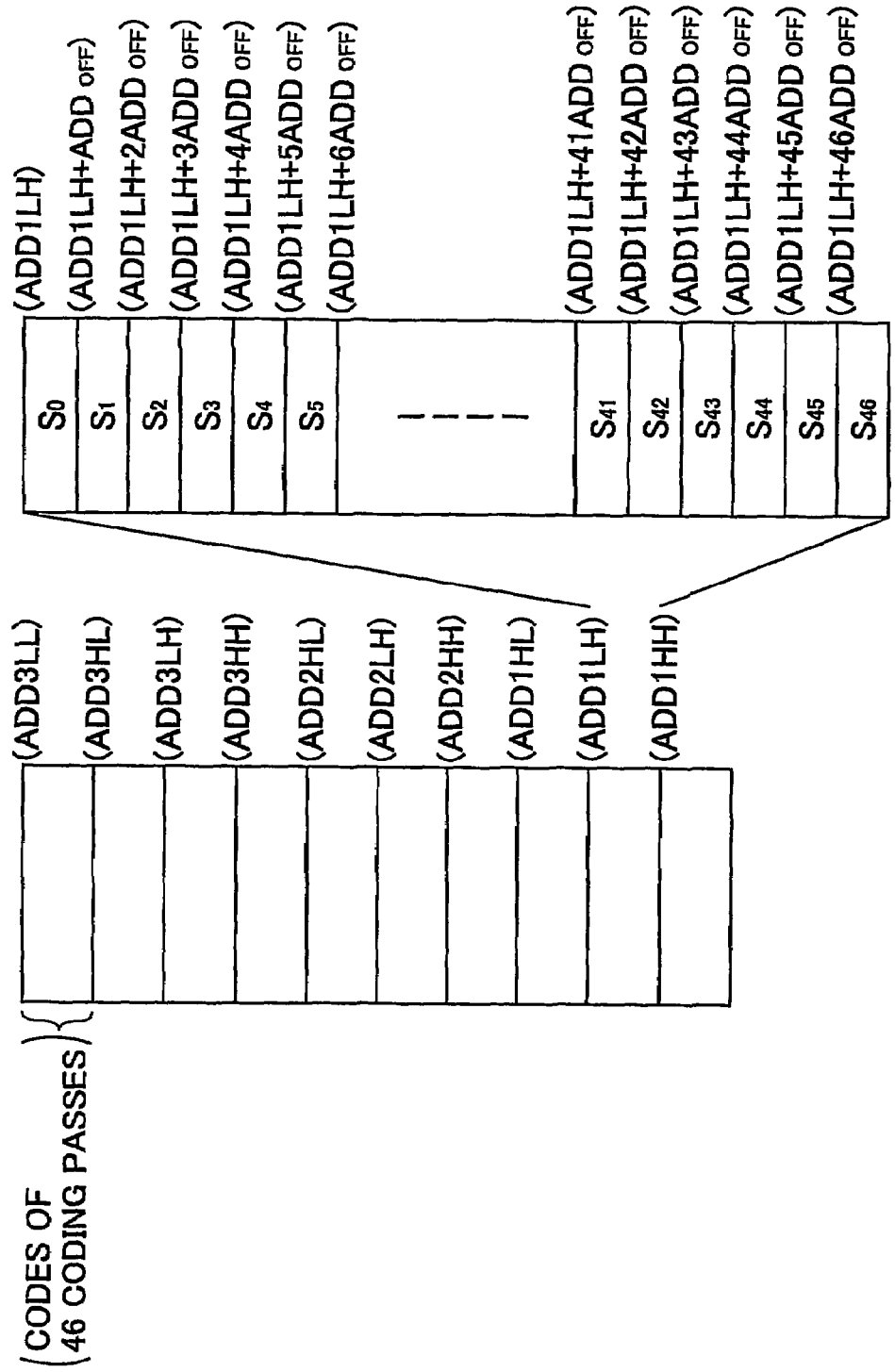
FIG. 8 is a diagram showing a memory map of the memory C of the image compression device 100 according to the first embodiment of the present invention.

FIG. 8 is a diagram showing a memory map of the memory C. The memory D has the same memory map with the memory C.

As shown in FIG. 8, in the memory C, at an address ADD3LL, there are loaded the data indicating the amount of the codes to be truncated when truncating the codes of the 46 coding passes in the 3LL sub-band from the bit-plane of the least significant bit.

Similarly, at addresses ADD3HL, ADD3HL, ADD3HH, ADD2HL, ADD2LH, ADD2HH, ADD1HL, ADD1LH, and ADD1HH, there are respectively loaded the data indicating the amounts of codes to be truncated from the respective sub-bands.

Further, FIG. 8 shows specific data stored at address from ADD1LH to ADD1HH, that is, the amount of codes of coding passes to be truncated from the bit-plane of the least significant bit. Here, the amount of codes to be truncated is denoted as Sn, where n takes values from 0 to 46, and the amount of codes to be truncated is defined to have a specified bit length, for example, 20 bits.

If the offset address $ADD_{OFF}$ is determined, which is related to a 20-bit long storage region, data indicating the amount of codes to be truncated (Sn), when the code pass No. 0 through the code pass No. 46 are truncated one by one sequentially, may be stored at an address equal to the sum of an address ADD1LH and the offset address $ADD_{OFF}$ multiplied by the number of the coding passes to be truncated, that is, the amounts of codes to be truncated (Sn) are respectively stored at addresses ADD1LH, ADD1LH+$ADD_{OFF}$, ADD1LH+2×$ADD_{OFF}$, ADD1LH+3×$ADD_{OFF}$, . . . , and ADD1LH+46×$ADD_{OFF}$.

Figure 9:
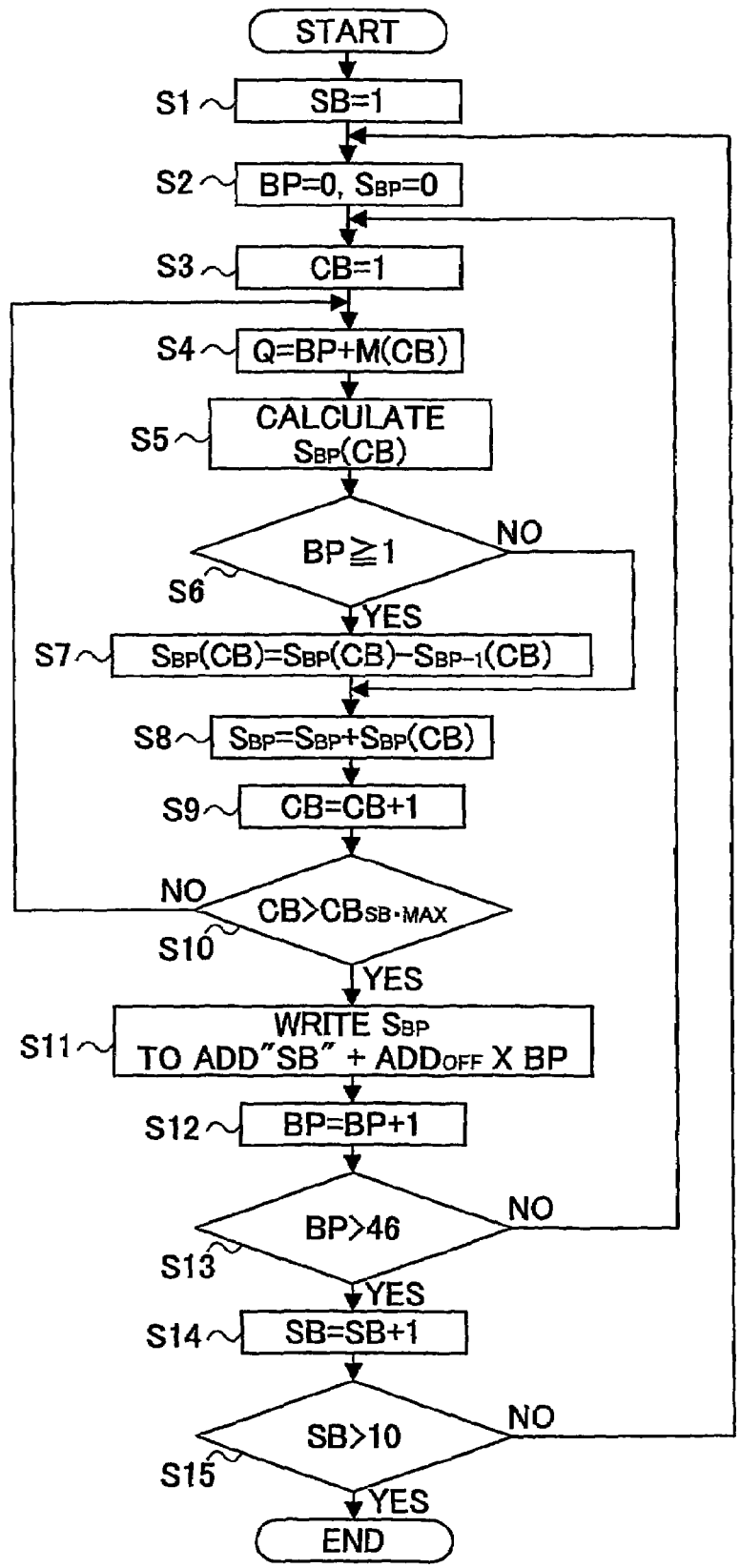
FIG. 9 is a flowchart showing the operation of the data processing circuit 29 of the image compression device 100 according to the first embodiment of the present invention.

FIG. 9 is a flowchart showing the operation of the data processing circuit 29. Here, if the flowchart shown in FIG. 9 is input to a logic synthesis tool made by the company Synopsys, USA, a specific circuit can be automatically designed.

First, sub-bands are defined corresponding to values of a sub-band determining parameter SB. Specifically, SB=1 corresponds to a sub-band 3LL, SB=2 corresponds to the sub-band 3HL, SB=3 corresponds to the sub-band 3LH, SB=4 corresponds to the sub-band 3HH, SB=5 corresponds to the sub-band 2HL, SB=6 corresponds to the sub-band 2LH, SB=7 corresponds to the sub-band 2HH, SB=8 corresponds to the sub-band 1HL, SB=9 corresponds to the sub-band 1LH, and SB=10 corresponds to the sub-band 1HH.

As shown in FIG. 9, in step S1, the data processing circuit 29 sets the parameter SB equal to one.

In step S2, the data processing circuit 29 sets a parameter BP equal to zero, and a variable $S_{BP}$ equal to zero. The parameter BP determines the number of the coding passes, codes in which are to be truncated. The variable $S_{BP}$ indicates reduction of the amount of codes when a number of BP coding passes are truncated one by one from the bit-plane of the least significant bit. The reduction of the amount of codes is referred to as "change of the amount of codes".

In step S3, the data processing circuit 29 sets a parameter CB equal to one. The parameter CB determines a code block of the sub-band specified by the parameter SB.

In step S4, the data processing circuit 29 sets a parameter Q to a value equaling the sum of the parameter BP and the number of coding masks M(CB) to be truncated in the code block specified by the parameter CB. That is, the parameter Q indicates a number of the coding passes to be actually truncated in the code block.

In step S5, the data processing circuit 29 calculates a total amount of codes (represented by $S_{BP}(CB)$) of a number of Q coding passes from the bit-plane of the least significant bit of the code block specified by the parameter CB.

In step S6, if the parameter BP is zero, that is, only codes of a number of coding passes specified by the number of masks M(CB) are to be truncated, the data processing circuit 29 goes to step S8, where the value of the parameter $S_{BP}$ is incremented by the value of the variable $S_{BP}(CB)$.

If the parameter BP is greater than or equal to one, the data processing circuit 29 goes to step S7.

In step S7, the data processing circuit 29 assigns the difference between the present value of the variable $S_{BP}(CB)$ and the last value of $S_{BP}(CB)$, that is, $S_{BP-1}(CB)$, to the variable $S_{BP}(CB)$.

In step S8, the data processing circuit 29 increments the value of the parameter $S_{BP}$ by the value of the variable $S_{BP}(CB)$.

In step S9, the data processing circuit 29 increments the parameter CB by one.

In step S10, the data processing circuit 29 determines whether the parameter CB is greater than the maximum number $CB_{SB-MAX}$ assigned to the code blocks of the sub-band specified by the parameter SB.

If the parameter CB is not greater than the maximum number $CB_{SB-MAX}$, the data processing circuit 29 goes back to step S4. If the parameter CB is greater than the maximum number $CB_{SB-MAX}$, the data processing circuit 29 goes to step S11.

In step S11, the data processing circuit 29 loads the value of the parameter $S_{BP}$ at an address equaling the sum of an offset address $ADD_{OFF} \times BP$ and an address ADD"SB" in the memory selected from the memory A and the memory B, which are alternatively switched to the enabling state frame by frame.

For example, when the parameter SB is one, as shown in FIG. 8, the address ADD"SB" represents the address ADD3LL.

In step S12, the data processing circuit 29 increments the parameter BP by one.

In step S13, the data processing circuit 29 determines whether the parameter BP is greater than 46. If the parameter BP is not greater than 46, the data processing circuit 29 goes back to step S3.

If the parameter BP is greater than 46, that is, all of the 46 coding passes of the sub-band specified by the parameter BP have been processed, the data processing circuit 29 goes to step S14 to process the next sub-band.

In step S14, in order to process the next sub-band, the data processing circuit 29 increments the parameter SB by one.

In step S15, the data processing circuit 29 determines whether the parameter SB is greater than 10, which is the maximum of the parameter SB as defined above.

If the value of the parameter SB is not greater than 10, the data processing circuit 29 returns to step S2.

If the value of the parameter SB is greater than 10, it means that all of the sub-bands have been processed, and the data processing circuit 29 stops the routine.

The operations shown by the flowchart in FIG. 9 can be performed by software executed in a not-illustrated central processing unit.

2.3 Packet Header Generation Unit 30

As shown in FIG. 3, the packet header generation unit 30 includes a rate control circuit 32, a packet information generation circuit 34, a packet header generation circuit 36, a code formation circuit 38, and DMAs 31, 33, 35, 37.

The packet header generation unit 30 determines the data numbers of the truncation data sets appropriate for truncating a desired amount of codes. The packet header generation unit 30 determines the data numbers of the truncation data sets based on the amount of codes to be truncated obtained by the arithmetic coding unit 20, including both the amount of codes of coding passes in each sub-band truncated one by one from the bit-plane of the least significant bit, and the amount of codes to be truncated related to the number of masks of each code block. The packet header generation unit 30 further generates a packet header of codes obtained based on truncation data set specified by the determined data number, and generates a bit stream and outputs the bit stream.

The rate control circuit 32 reads out a truncation data set corresponding to a data number 128, which is defined in the truncation table in FIG. 2, from the DRAM 50 through the DMA 31. According to the truncation data set read out from the DRAM 50, the rate control circuit 32 calculates the total amount of codes to be truncated determined for each code block in each sub-band. Then the rate control circuit 32 compares the calculated total amount of codes to be truncated with a target value.

If the calculated total amount of codes to be truncated is less than the target value, the rate control circuit 32 reads out the truncation data set corresponding to a data number greater than the previous one, and according to the truncation data set, the rate control circuit 32 calculates again the total amount of codes to be truncated in each sub-band.

If the calculated amount of codes to be truncated is greater than the target value, the rate control circuit 32 reads out a truncation data set corresponding to a data number less than the previous one, and according to the truncation data set, the rate control circuit 32 calculates again the total amount of codes to be truncated in each sub-band.

In this way, the rate control circuit 32 determines a truncation data set that results in a calculated total amount of codes to be truncated approximately the same as the target value. The rate control circuit 32 outputs the determined truncation data set to the packet information generation circuit 34.

Figure 10:
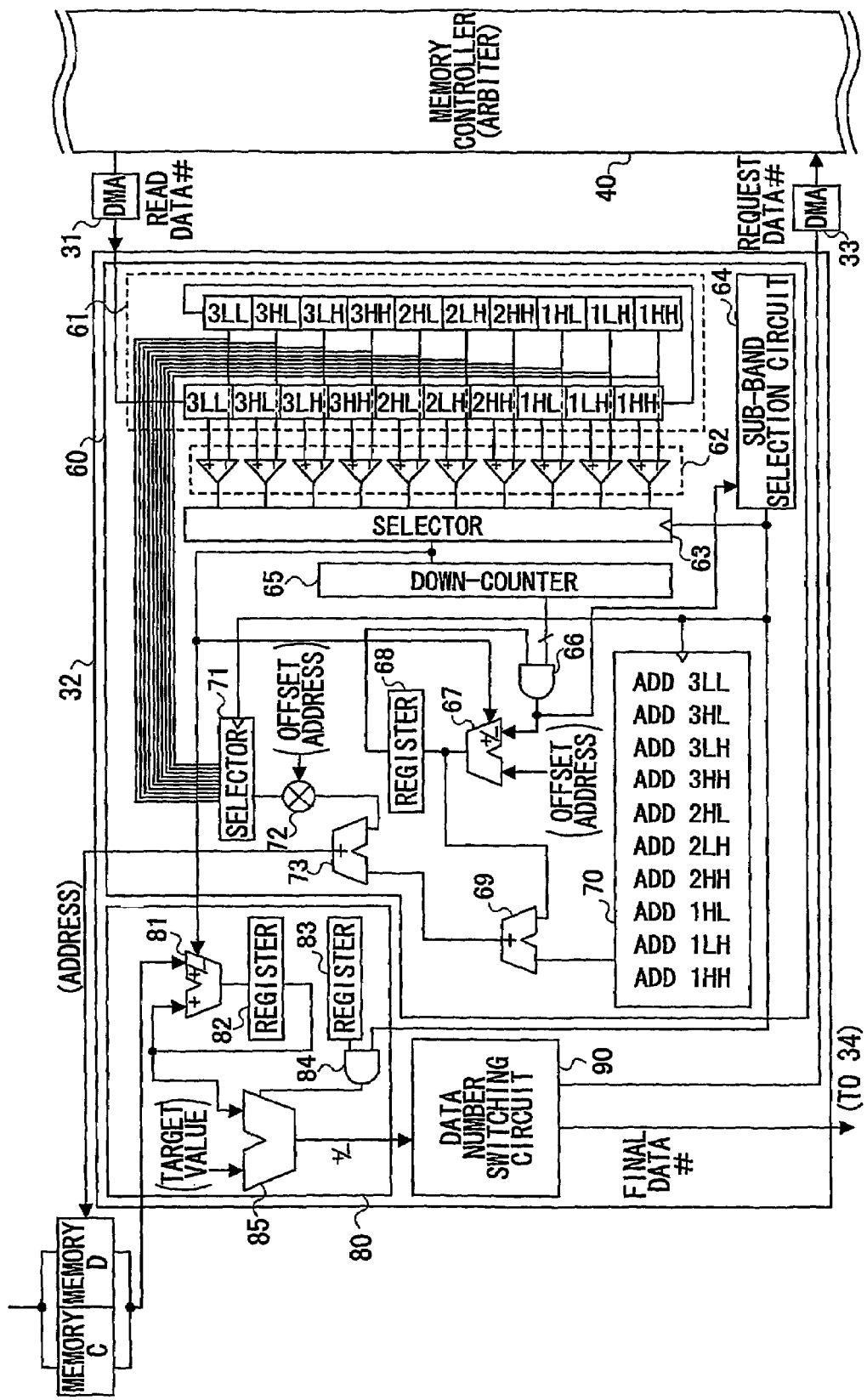
FIG. 10 is a block diagram showing a configuration of the rate control circuit 32 of the image compression device 100 according to the first embodiment of the present invention.

FIG. 10 is a block diagram showing a configuration of the rate control circuit 32.

As shown in FIG. 10, the rate control circuit 32 includes an address generation circuit 60, a code amount calculation circuit 80, and a data number switching circuit 90.

The address generation circuit 60 and the code amount calculation circuit 80 read out a truncation data set corresponding to a specified data number from the truncation table in FIG. 2, and according to the obtained truncation data set, calculate change of the amount of codes when truncating codes of coding passes in each sub-band coding pass by coding pass from the bit-plane of the least significant bit. That is, the address generation circuit 60 and the code amount calculation circuit 80 act as a calculating unit for calculating the change of the amount of codes.

Based on the truncation data set input through the DMA 31, the address generation circuit 60 generates an address signal for reading out data indicating the amount of codes of a bit-plane to be added or subtracted, and outputs the address signal to the memory C or memory D. The data indicating the amount of codes to be truncated loaded at the specified address in either the memory C or the memory D, which is in an enabled state and holds data of the image frame being processed, are output to the code amount calculation circuit 80.

The code amount calculation circuit 80 sums the amount of codes to be truncated in each sub-band sent from the memory C or the memory D, and compares the total amount of codes to be truncated with the target value. The code amount calculation circuit 80 generates a signal indicating the comparison result and outputs the signal to the data number switching circuit 90.

Based on the comparison result output from the code amount calculation circuit 80, the data number switching circuit 90, through the DMA 33, makes a request to the DRAM 50 for a truncation data set having a different data number.

When a truncation data set is determined to gives a total amount of codes to be truncated roughly equal to the target value, the data number switching circuit 90 outputs a signal indicating the data number of the truncation data set to the packet header generation circuit 36.

Below, detailed explanations are made of configurations and operations of the address generation circuit 60, the code amount calculation circuit 80, and the data number switching circuit 90.

The address generation circuit 60 includes a shift register 61, a comparator 62, a selector 63, a sub-band selection circuit 64, a down-counter 65, an AND gate 66, a calculation unit 67, a register 68, an accumulator 69, a selector 70, a selector 71, a multiplier 72, and an accumulator 73.

The truncation data set is input to the shift register 61 of the address generation circuit 60 through the DMA 31.

The shift register 61 stores the present truncation data set and the last truncation data set. The comparator 62 subtracts the last truncation data set from the present truncation data set in each sub-band (that is, sub-bands 3LL, 3HL, 3LH, 3HH, 2HL, 2LH, 2HH, 1HL, 1LH, and 1HH), and outputs the obtained result to the selector 63. The last truncation data set in each sub-band is output to the selector 71.

The sub-band selection circuit 64 updates a sub-band selection signal so as to select a next sub-band in response to a request signal input to the sub-band selection circuit 64 for updating the sub-band selection signal. Then the sub-band selection circuit 64 outputs the updated sub-band selection signal.

In response to the selection signal input from the sub-band selection circuit 64, the selector 63 sequentially outputs data indicating the comparison results related to sub-bands 3LL, 3HL, 3LH, 3HH, 2HL, 2LH, 2HH, 1HL, 1LH, and 1HH to the down-counter 65. As for the data indicating the comparison results, for example, when the 1HL sub-band is selected according to the selection signal, if the last truncation data set of the 1HL sub-band is one, and the present truncation data set is three, then the difference of the present truncation data set and the last truncation data set (+2) is the data indicating the comparison result. The selector 63 outputs the comparison result to the down counter 65.

The down counter 65 sets the data indicating the comparison result output from the selector 63 as a value to be counted down, and starts to count down. The counting-down value is input to one input terminal of the AND gate 66. An output signal from the register 68 is input to the other input terminal of the AND gate 66. That is, when the counter 65 is counting down, the AND gate 66 outputs the value of the register 68 directly to one input terminal of the calculation unit 67. When the counter 65 completes counting, the AND gate 66 outputs a low level signal. The low level signal is output to the sub-band selection circuit 64 as the selection signal updating request signal.

The signal from the selector 63 is input to the addition-subtraction control terminal of the calculation unit 67. That is, when an addition-subtraction control signal indicating positive is input, the calculation unit 67 accumulates offset address $ADD_{OFF}$ in synchronization with the counting down timing of the down counter 65, and outputs the result to one input terminal of the accumulator 69. To the contrary, when an addition-subtraction control signal indicating negative is input, the calculation unit 67 subtracts the offset address $ADD_{OFF}$ from the value stored in the register 68 in synchronization with the counting down timing of the down counter 65.

The selector 70 outputs the corresponding address ADD (ADD3LL through ADD1HH) to the other input terminal of the accumulator 69 in response to the selection signal output from the sub-band selection circuit 64. The accumulator 69 adds the offset address $ADD_{OFF}$ with a sub-band address ADD output from the selector 70 by a number of times equal to the times of counting by the down counter 65, and outputs the obtained address data to one input terminal of the accumulator 73.

The multiplier 72 calculates the product of the output value of the selector 71 and the value of the offset address $ADD_{OFF}$, and outputs the result to the other input terminal of the accumulator 73.

The selector 71 outputs the last truncation data set of the sub-band specified by the selection signal output from the sub-band selection circuit 64.

Because of the above configuration, the accumulator 73, in synchronization with the counting down timing of the down counter 65, generates an address for reading out data indicating an increase or a decrease in the amount of codes in each sub-band.

The code amount calculation circuit 80 includes a calculation unit 81, a register 82, a register 83, an AND gate 84, and a comparator 85.

The addition-subtraction control signal generated in the address generation circuit 60 is input to the addition-subtraction control terminal of the calculation unit 81 of the code amount calculation circuit 80. In addition, data indicating the amount of codes to be truncated, which is stored at the address specified by the address generation circuit 60, is read out from either the memory C or the memory D which is in the enabled state, and is also input to the addition-subtraction control terminal of the calculation unit 81 of the code amount calculation circuit 80.

The calculation unit 81 inputs its last output to its own other input terminal through the register 82. By such a configuration, the amount of codes to be truncated based on the truncation data set selected presently is loaded in the register 82.

The sub-band selection circuit 64 in the address generation circuit 60 outputs the selection signal to one input terminal of the AND gate 84. The other input terminal of the AND gate 84 is connected to the register 83.

The register 83 stores data having the same value as that of the selection signal output after the 1HH sub-band is selected, that is, after all sub-bands are selected, and before the first sub-band, that is, the 3LL sub-band, is selected again.

Due to this, after all sub-bands are selected by the sub-band selection circuit 64, the AND gate 84 outputs a high level enabling signal to the enabling terminal of the comparator 85.

The comparator 85 compares the total amount of codes to be truncated of all sub-bands output from the register 82 with a target value. If the total amount of codes to be truncated is higher than the target value, the comparator 85 outputs a high level signal to the data number switching circuit 90, and if the total amount of codes to be truncated is lower than the target value, the comparator 85 outputs a low level signal to the data number switching circuit 90.

Figure 11:
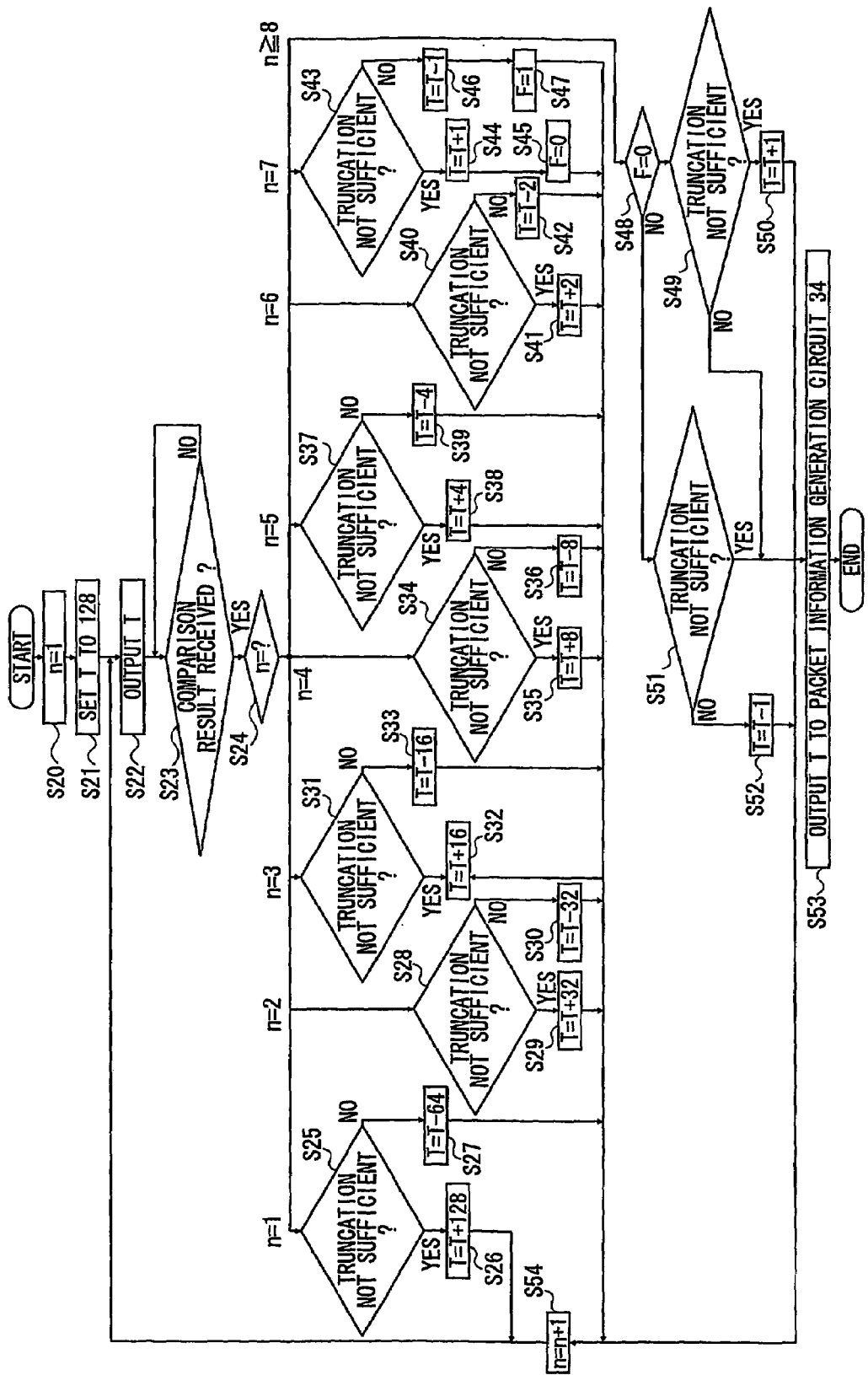
FIG. 11 is flowchart showing the operation of the data number switching circuit 90 of the image compression device 100 according to the first embodiment of the present invention.

FIG. 11 is flowchart showing the operation of the data number switching circuit 90. Here, if the flowchart shown in FIG. 11 is input to the logic synthesis tool made by the company Synopsys, USA, a specific circuit can be automatically designed.

As shown in FIG. 11, in step S20, the data number switching circuit 90 sets a processing index n equal to one.

In step S21, the data number switching circuit 90 sets the data number (T) of truncation data set equal to 128.

In step S22, the data number switching circuit 90 outputs the specified data number T to the DMA 33.

In step S23, the data number switching circuit 90 determines whether the comparison result signal is input from the comparator 85 of the code amount calculation circuit 80, which compares the total amount of codes to be truncated of all sub-bands with the target value.

If the comparison result signal is not input yet, the data number switching circuit 90 waits for the signal until it is input.

If the comparison result signal is input, the data number switching circuit 90 goes to the process in step S24.

In step S24, the data number switching circuit 90 identifies the present value of the processing index n. According to the present value of the processing index n, and depending on whether the total amount of codes to be truncated is higher than the target value (high level comparison result signal), or the total amount of codes to be truncated is lower than the target value (low level comparison result signal), the data number switching circuit 90 conducts the following process.

Specifically, the data number switching circuit 90 goes to step S25 if the processing index n is one, to step S28 if the index n is two, to step S31 if the index n is three, to step S34 if the index n is four, to step S37 if the index n is five, to step S40 if the index n is six, to step S43 if the index n is seven, and to step S48 if the index n is greater than or equal to eight.

In step S25, the processing index n is one. The data number switching circuit 90 determines whether the amount of codes to be truncated is lower than the target value.

If the amount of codes to be truncated is lower than the target value, the data number switching circuit 90 goes to step S26. If the amount of codes to be truncated is not lower than the target value, the data number switching circuit 90 goes to step S27.

In step S26, the data number switching circuit 90 adds 128 to the present value of the data number T (128), and returns to step S22. That is, if the amount of codes to be truncated is lower than the target value, the processing index n remains to be one.

In step S27, the data number switching circuit 90 subtracts 64 from the present value of the data number T (128), and goes to step S54, where the index n is increased by one. Then the data number switching circuit 90 returns to step S22.

That is, if the amount of codes to be truncated is not lower than the target value, the processing index n is increased by one.

In step S28, the processing index n is two. The data number switching circuit 90 determines whether the amount of codes to be truncated is lower than the target value.

If the amount of codes to be truncated is lower than the target value, the data number switching circuit 90 goes to step S29. If the amount of codes to be truncated is not lower than the target value, the data number switching circuit 90 goes to step S30.

In step S29, the data number switching circuit 90 adds 32 to the present value of the data number T, and goes to step S54, where the index n is incremented by one. Then the data number switching circuit 90 returns to step S22.

In step S30, the data number switching circuit 90 subtracts 32 from the present value of the data number T, and goes to step S54, where the index n is incremented by one. Then the data number switching circuit 90 returns to step S22.

In step S31, the processing index n is three. The data number switching circuit 90 determines whether the amount of codes to be truncated is lower than the target value.

If the amount of codes to be truncated is lower than the target value, the data number switching circuit 90 goes to step S32. If the amount of codes to be truncated is not lower than the target value, the data number switching circuit 90 goes to step S33.

In step S32, the data number switching circuit 90 adds 16 to the present value of the data number T, and goes to step S54, where the index n is incremented by one. Then the data number switching circuit 90 returns to step S22.

In step S33, the data number switching circuit 90 subtracts 16 from the present value of the data number T, and goes to step S54, where the index n is incremented by one. Then the data number switching circuit 90 returns to step S22.

In step S34, the processing index n is four. The data number switching circuit 90 determines whether the amount of codes to be truncated is lower than the target value.

If the amount of codes to be truncated is lower than the target value, the data number switching circuit 90 goes to step S35. If the amount of codes to be truncated is not lower than the target value, the data number switching circuit 90 goes to step S36.

In step S35, the data number switching circuit 90 adds 8 to the present value of the data number T, and goes to step S54, where the index n is incremented by one. Then the data number switching circuit 90 returns to step S22.

In step S36, the data number switching circuit 90 subtracts 8 from the present value of the data number T, and goes to step S54, where the index n is incremented by one. Then the data number switching circuit 90 returns to step S22.

In step S37, the processing index n is five. The data number switching circuit 90 determines whether the amount of codes to be truncated is lower than the target value.

If the amount of codes to be truncated is lower than the target value, the data number switching circuit 90 goes to step S38. If the amount of codes to be truncated is not lower than the target value, the data number switching circuit 90 goes to step S39.

In step S38, the data number switching circuit 90 adds 4 to the present value of the data number T, and goes to step S54, where the index n is incremented by one. Then the data number switching circuit 90 returns to step S22.

In step S39, the data number switching circuit 90 subtracts 4 from the present value of the data number T, and goes to step S54, where the index n is incremented by one. Then the data number switching circuit 90 returns to step S22.

In step S40, the processing index n is six. The data number switching circuit 90 determines whether the amount of codes to be truncated is lower than the target value.

If the amount of codes to be truncated is lower than the target value, the data number switching circuit 90 goes to step S41. If the amount of codes to be truncated is not lower than the target value, the data number switching circuit 90 goes to step S42.

In step S41, the data number switching circuit 90 adds 2 to the present value of the data number T, and goes to step S54, where the index n is incremented by one. Then the data number switching circuit 90 returns to step S22.

In step S42, the data number switching circuit 90 subtracts 2 from the present value of the data number T, and goes to step S54, where the index n is incremented by one. Then the data number switching circuit 90 returns to step S22.

In step S43, the processing index n is seven. The data number switching circuit 90 determines whether the amount of codes to be truncated is lower than the target value.

If the amount of codes to be truncated is lower than the target value, the data number switching circuit 90 goes to step S44. If the amount of codes to be truncated is not lower than the target value, the data number switching circuit 90 goes to step S46.

In step S44, the data number switching circuit 90 adds 1 to the present value of the data number T.

In step S45, the data number switching circuit 90 sets a flag F to zero, and goes to step S54, where the index n is increased by one. Then the data number switching circuit 90 returns to step S22.

In step S46, the data number switching circuit 90 subtracts 1 from the present value of the data number T.

In step S47, the data number switching circuit 90 sets a flag F to one, and goes to step S54, where the index n is incremented by one. Then the data number switching circuit 90 returns to step S22.

In step S48, the processing index n is greater than or equal to eight. The data number switching circuit 90 determines whether the flag F is zero.

If the flag F is zero, the data number switching circuit 90 goes to step S49. If the flag F is not zero, the data number switching circuit 90 goes to step S51.

In step S49, the data number switching circuit 90 determines whether the amount of codes to be truncated is lower than the target value.

If the amount of codes to be truncated is lower than the target value, the data number switching circuit 90 goes to step S50. If the amount of codes to be truncated is not lower than the target value, the data number switching circuit 90 goes to step S53.

In step S50, the data number switching circuit 90 adds 1 to the present value of the data number T, and goes to step S54, where the index n is incremented by one. Then the data number switching circuit 90 returns to step S22.

Here, increasing the data number T by only one causes a change of the comparison result of the amount of codes to be truncated with the target value, that is, from the state in which the amount of codes to be truncated is lower than the target value to the state in which the amount of codes to be truncated is higher than the target value. In other words, it can be concluded that the amount of codes to be truncated reaches to the target value.

In step S51, the data number switching circuit 90 determines whether the amount of codes to be truncated is lower than the target value.

If the amount of codes to be truncated is lower than the target value, the data number switching circuit 90 goes to step S53. If the amount of codes to be truncated is not lower than the target value, the data number switching circuit 90 goes to step S52.

In step S52, the data number switching circuit 90 subtracts 1 from the present value of the data number T, and goes to step S54, where the index n is incremented by one. Then the data number switching circuit 90 returns to step S22.

Here, the same as in step S50, decreasing the data number T by only one causes a change of the comparison result of the amount of codes to be truncated with the target value, that is, from the state in which the amount of codes to be truncated is higher than the target value to the state in which the amount of codes to be truncated is lower than the target value. In other words, it can be concluded that the amount of codes to be truncated reaches to target value.

In step S53, the data number switching circuit 90 determines thus obtained data number as the data number of truncation data set for use, and outputs a signal indicating the data number to the packet information generation circuit 34. Then the data number switching circuit 90 stops the processing.

The processing shown by the flowchart in FIG. 11 can be performed by software executed in a not-illustrated central processing unit.

If the truncation table has such an arrangement of truncation data sets that the amount of codes to be truncated decreases gradually when the data number increases, leading to gradually improved quality of the reproduced image, in step S21, instead of setting the initial value of the data number to 128, the initial value of the data number may be set to the 128th data number from the last data number of the truncation table. In addition, in the subsequent steps where the data number is modified, the relevant operations are reversed, for example, the operation of addition of 32 is changed to subtraction of 32.

Referring to FIG. 3 again, the packet information generation circuit 34 calculates the number of coding passes in each sub-band determined by the truncation data set corresponding to the data number selected by the data number switching circuit 90, and the amount of codes of these coding passes. The packet information generation circuit 34 outputs the obtained result to the packet header generation circuit 36.

Figure 12:
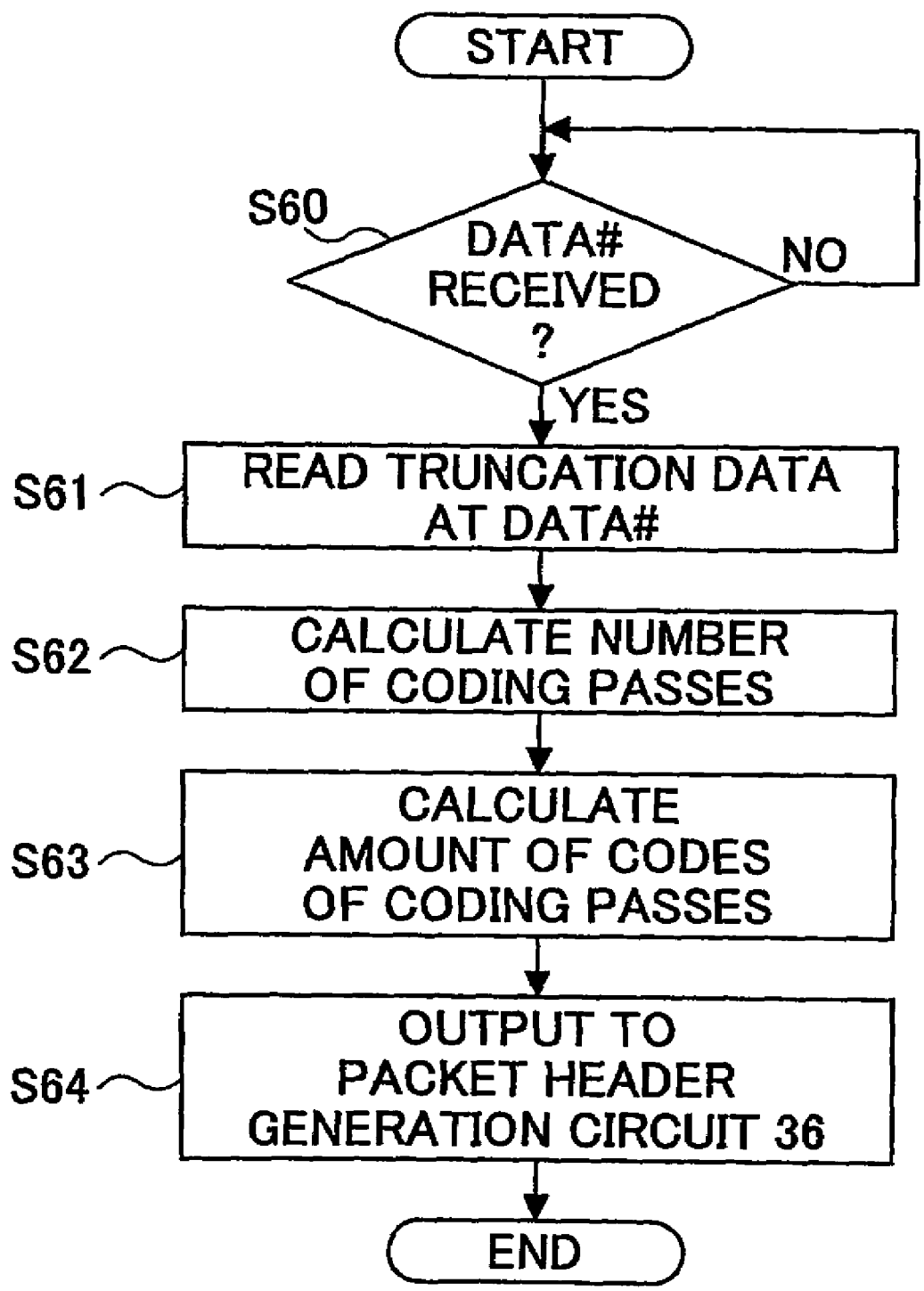
FIG. 12 is a flowchart showing the operation of the packet information generation circuit 34 of the image compression device 100 according to the first embodiment of the present invention.

FIG. 12 is a flowchart showing the operation of the packet information generation circuit 34. If the flowchart shown in FIG. 12 is input to the logic synthesis tool made by the company Synopsys, USA, a specific circuit can be automatically designed.

As shown in FIG. 12, in step S60, the packet information generation circuit 34 determines whether a data number T of a truncation table is input from the rate control circuit 32.

If the data number is not input yet, the packet information generation circuit 34 waits for the data number until it is input.

If the data number is input, the packet information generation circuit 34 goes to step S61.

In step S61, the packet information generation circuit 34 reads out the truncation data set corresponding to the data number T from DRAM 50.

In step S62, from the obtained truncation data set, the packet information generation circuit 34 calculates the number of the residual coding passes of each code block in each sub-band after code truncation.

In step S63, based on the obtained truncation data set, and from the data loaded in the memory C and memory D, the packet information generation circuit 34 calculates the amount of codes of the residual coding passes of each code block in each sub-band after code truncation.

In step S64, the packet information generation circuit 34 outputs the obtained number of coding passes in each sub-band and the amount of codes to the packet header generation circuit 36.

The operations shown by the flowchart in FIG. 12 can be performed by software executed in a not-illustrated central processing unit.

Referring to FIG. 3 again, the packet header generation circuit 36 generates a packet header from the number of coding passes in each sub-band and the amount of codes obtained by the packet information generation circuit 34, the number of zero bit-planes, and codes read out by DMA 37 from DRAM 50. Then the packet header generation circuit 36 outputs the generated packet header to the code formation circuit 38.

The code formation circuit 38 forms a bit stream using the data output from the packet header generation circuit 36, and outputs the codes, which are truncated by an amount equaling to the target amount of codes to be truncated, to external devices.

Here, a well known circuit may be used as the packet header generation circuit 36.

Second Embodiment

Figure 13:
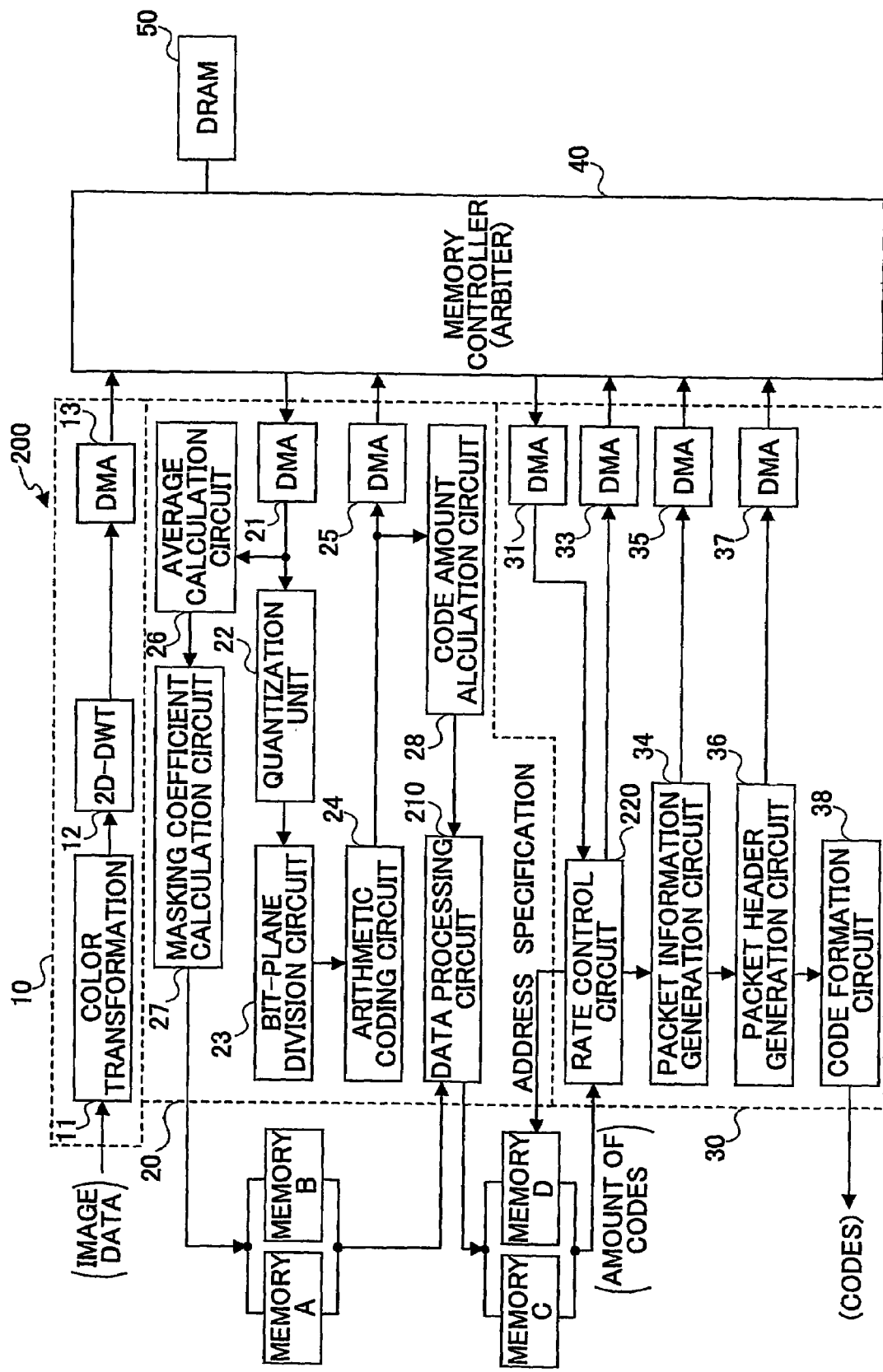
FIG. 13 is a block diagram showing a configuration of an image compression device 200 according to a second embodiment of the present invention.

FIG. 13 is a block diagram showing a configuration of an image compression device 200 according to a second embodiment of the present invention.

The configuration of the image compression device 200 is basically the same as that of the image compression device 100 in FIG. 3, except that the data processing circuit 210 of the arithmetic coding unit 20 and the rate control circuit 220 of the packet header generation unit 30 in the present embodiment are different from the data processing circuit 29 of the arithmetic coding unit 20 and the rate control circuit 32 of the packet header generation unit 30 in the preceding embodiment.

Below, only the data processing circuit 210 and the rate control circuit 220 are described in detail, and the same reference numbers are used for the same elements in the present embodiment as those in the preceding embodiment.

Figure 14:
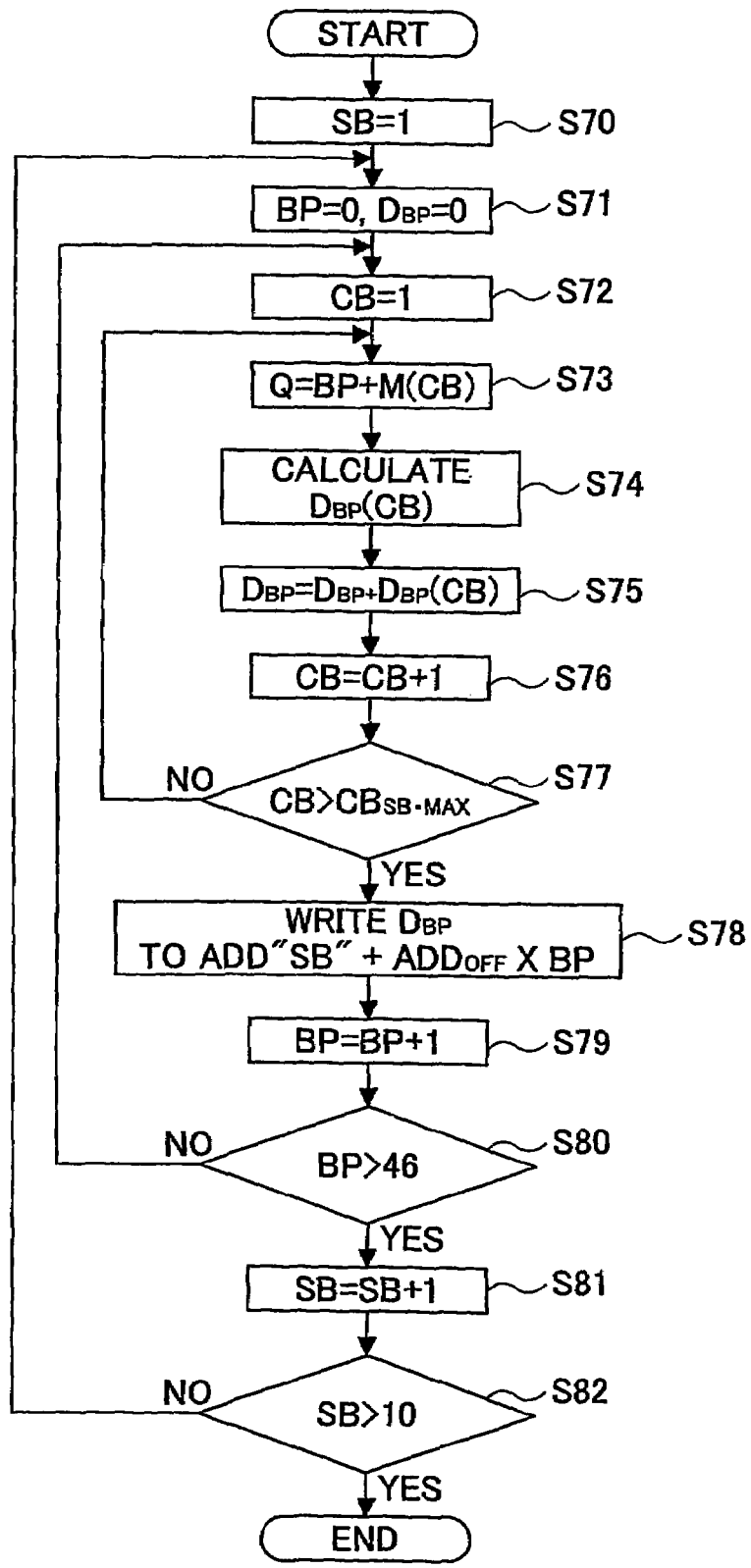
FIG. 14 is a flowchart showing the operation of the data processing circuit 210 of the image compression device 200 according to the second embodiment of the present invention.

FIG. 14 is a flowchart showing the operation of the data processing circuit 210. If the flowchart shown in FIG. 14 is input to the logic synthesis tool made by the company Synopsys, USA, a specific circuit can be automatically designed.

First, sub-bands are defined corresponding to values of the sub-band determining parameter SB. Specifically, SB=1 corresponds to a sub-band 3LL, SB=2 corresponds to the sub-band 3HL, SB=3 corresponds to the sub-band 3LH, SB=4 corresponds to the sub-band 3HH, SB=5 corresponds to the sub-band 2HL, SB=6 corresponds to the sub-band 2LH, SB=7 corresponds to the sub-band 2HH, SB=8 corresponds to the sub-band 1HL, SB=9 corresponds to the sub-band 1LH, and SB=10 corresponds to the sub-band 1HH.

As shown in FIG. 14, in step S70, the data processing circuit 210 sets the parameter SB equal to one.

In step S71, the data processing circuit 210 sets a parameter BP equal to zero, and a variable $D_{BP}$ equal to zero. The parameter BP determines the number of the coding passes, the codes in which are to be truncated. The variable $D_{BP}$ represents the total amount of codes of the processed code blocks after codes of a number of BP coding passes in the code blocks are truncated from the bit-plane of the least significant bit.

In step S72, the data processing circuit 210 sets a parameter CB equal to one. Consecutive numbers 1, 2, 3, . . . are assigned to the code blocks of the sub-band specified by the parameter SB, and the parameter CB determines one of the numbers.

In step S73, the data processing circuit 210 sets a parameter Q to a value equaling the sum of the parameter BP and the number of masks M(CB) to be truncated in the code block specified by the parameter CB. That is, the parameter Q indicates the number of the coding passes to be actually truncated in the code block.

In step S74, the data processing circuit 210 performs a calculation to obtain the total amount of codes (represented by $S_{BP}(CB)$) corresponding to the number of Q coding passes to be truncated from the bit-plane of the least significant bit of the code block specified by the parameter CB.

The data processing circuit 210 determines the total amount of codes (represented by $S_{ALL}(CB)$) of the code block corresponding to the value of the parameter CB based on the output of the code amount calculation circuit 28, and calculates a total amount of codes (represented by $S_{BP}(CB)$) corresponding to the number of Q coding passes from data loaded in the memory A or the memory B. In addition, the data processing circuit 210 subtracts $S_{BP}(CB)$ from $S_{ALL}(CB)$ and obtains a variable $D_{BP}(CB)$.

In step S75, the data processing circuit 210 assigns a sum of the value of the variable $D_{BP}(CB)$ and the value of the parameter $D_{BP}$ to the variable $D_{BP}(CB)$; as mentioned above, the variable $D_{BP}$ represents the total amount of codes of the processed code blocks.

In step S76, the data processing circuit 210 increments the parameter CB by one.

In step S77, the data processing circuit 210 determines whether the parameter CB is greater than the maximum number $CB_{SB-MAX}$ assigned to the code blocks of the sub-band specified by the parameter SB.

If the parameter CB is not greater than the maximum number $CB_{SB-MAX}$, the data processing circuit 210 goes back to step S73. If the parameter CB is greater than the maximum number $CB_{SB-MA}$, the data processing circuit 210 goes to step S78.

In step S78, the data processing circuit 210 stores the value of the parameter $D_{BP}$ at an address equaling the sum of an offset address $ADD_{OFF} \times BP$ and an address ADD"SB" in the memory selected from the memory A and the memory B, which are alternatively switched to the enabling state frame by frame.

For example, when the parameter SB is one, the address ADD"SB" represents the address ADD3LL.

In step S79, the data processing circuit 210 increases the parameter BP by one.

In step S80, the data processing circuit 210 determines whether the parameter BP is greater than 46. If the parameter BP is not greater than 46, the data processing circuit 210 goes back to step S72.

If the parameter BP is greater than 46, that is, all of the 46 coding passes of the sub-band specified by the parameter BP have been processed, the data processing circuit 210 goes to step S81 to process the next sub-band.

In step S81, in order to process the next sub-band, the data processing circuit 210 increments the parameter SB by one.

In step S82, the data processing circuit 210 determines whether the parameter SB is greater than 10, which is the maximum of the parameter SB as defined above.

If the value of the parameter SB is not greater than 10, the data processing circuit 210 returns to step S71.

If the value of the parameter SB is greater than 10, it means that all of the sub-bands have been processed, and the data processing circuit 210 stops the routine.

The operations shown by the flowchart in FIG. 14 can be performed by software executed in a not-illustrated central processing unit.

Figure 15:
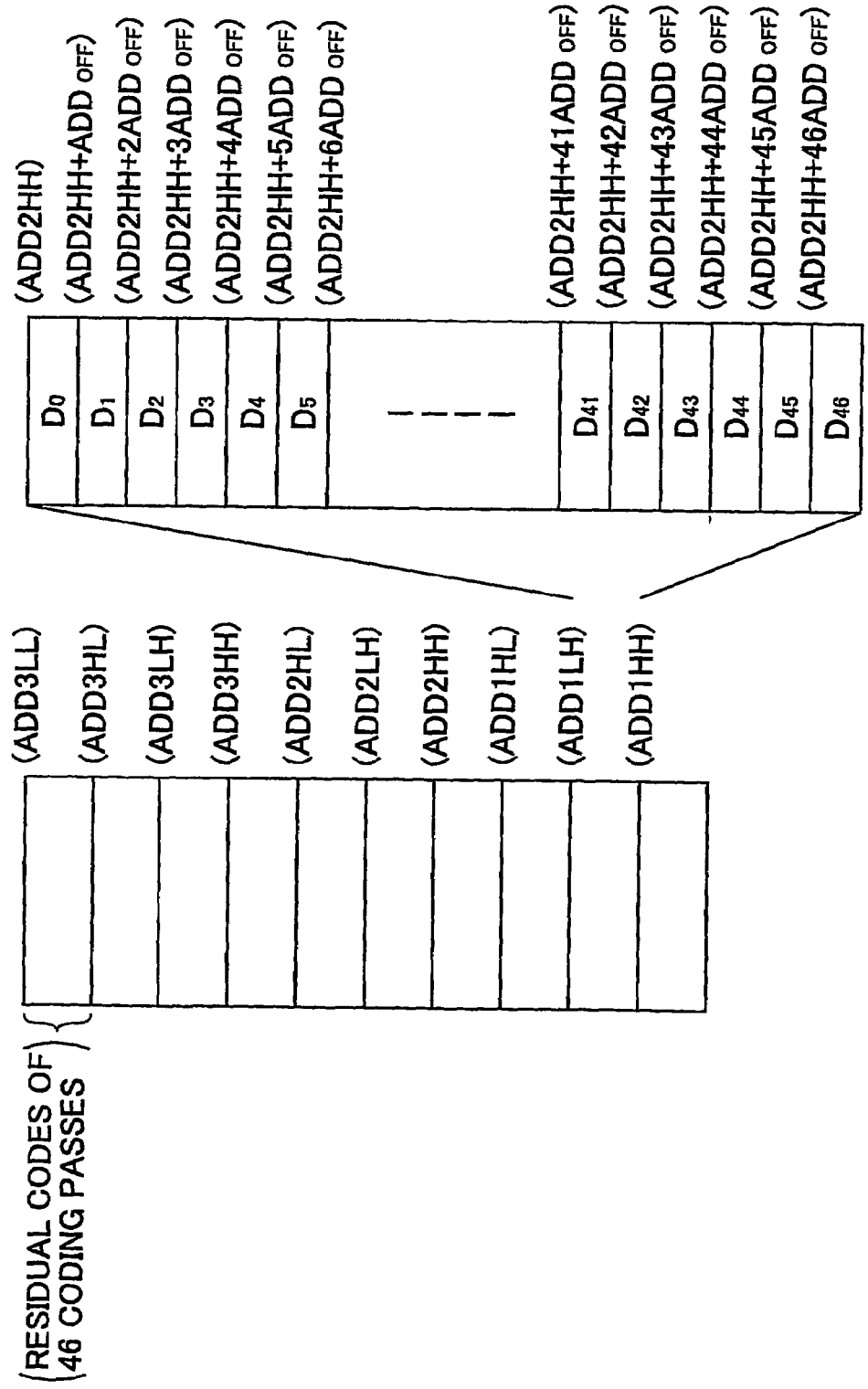
FIG. 15 is a diagram showing a memory map of the memory C of the image compression device 200 according to the second embodiment of the present invention.

FIG. 15 is a diagram showing a memory map of the memory C of the image compression device 200. The memory D has the same memory map as the memory C.

As shown in FIG. 15, in the memory C, at an address ADD3LL, there are loaded data indicating the total amount of the residual codes. The total amount of the residual codes is defined to be the amount of the codes after truncating codes of the 46 coding passes of the sub-band 3LL code pass by code pass from the bit-plane of the least significant bit in each sub-band, and after truncating codes of a number of M coding passes, where M is the number of masks determined in each code block.

Similarly, at addresses ADD3HL, ADD3HL, ADD3HH, ADD2HL, ADD2LH, ADD2HH, ADD1HL, ADD1LH, and ADD1HH, there are respectively stored the data indicating the total amount of the residual codes in the corresponding sub-bands.

Further, FIG. 15 shows data stored at address from ADD2HH to ADD1HL, specifically, the total amount of the residual codes are presented, which is the amount of the residual codes after truncating codes of the 46 coding passes of the sub-band 3LL code pass by code pass from the bit-plane of the least significant bit in each sub-band, and after truncating codes of a number of coding passes equaling to the number of masks specified code block by code block.

Here, the total amount of the residual codes is denoted as Dn, where n takes values from 0 to 46. The total amount of the residual codes is defined to have a specified bit length, for example, 20 bits.

If the offset address $ADD_{OFF}$ is determined, which is related to a 20-bit long storage region, data indicating the amount of the residual codes (Dn) when 0, or 1, or 2, . . . , or 46 code pass are truncated, can be loaded at an address equal to a sum of an address ADD2HH and the offset address corresponding to the number of the truncated coding passes, that is, the amounts of the residual codes (Dn) are respectively loaded at addresses ADD2HH, ADD2HH+$ADD_{OFF}$, ADD2HH+$2 \times ADD_{OFF}$, ADD2HH+$3 \times ADD_{OFF}$, . . . , and ADD2HH+$46 \times ADD_{OFF}$.

Figure 16:
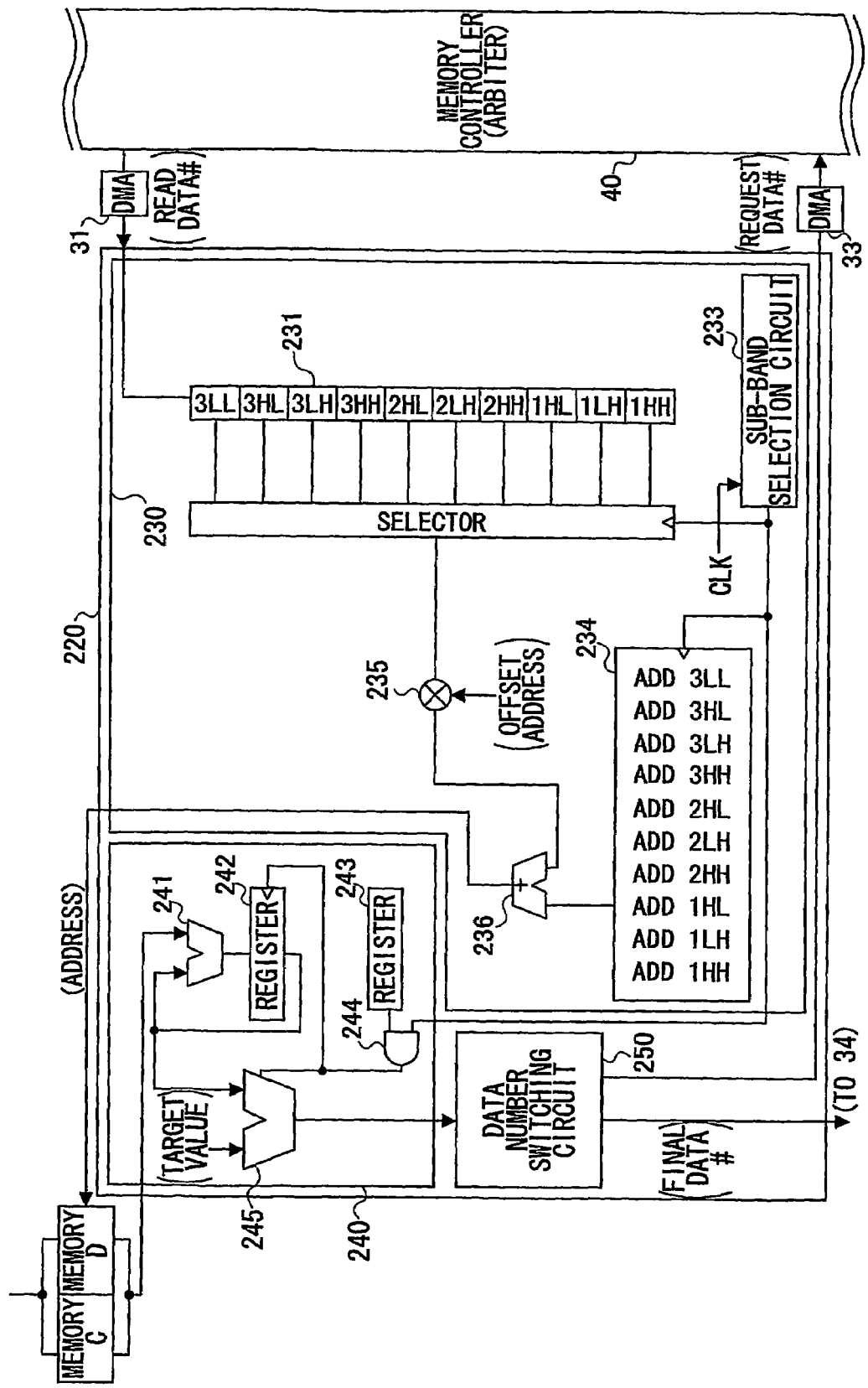
FIG. 16 is a block diagram showing a configuration of the rate control circuit 220 of the image compression device 200 according to the second embodiment of the present invention.

FIG. 16 is a block diagram showing a configuration of the rate control circuit 220 of the image compression device 200 according to the second embodiment of the present invention.

As shown in FIG. 16, the rate control circuit 220 includes an address generation circuit 230, a code amount calculation circuit 240, and a data number switching circuit 250.

The rate control circuit 220 reads out the truncation data set corresponding to a data number 128 from the DRAM 50 through the DMA 31. According to the truncation data set read out from the DRAM 50, the rate control circuit 220 reads out the data indicating the amount of codes after truncating codes in each sub-band from the memory C or memory D, and calculates the sum of the amounts of codes. Then the rate control circuit 220 compares the calculated amount of codes with a target value.

If the calculated amount of codes is greater than the target value, the rate control circuit 220 reads out the truncation data set corresponding to a data number greater than the previous one, and according to the truncation data set, the rate control circuit 220 calculates again the amount of codes after code truncation.

On the other hand, if the calculated amount of codes is less than the target value, the rate control circuit 220 reads out the truncation data set corresponding to a data number less than the previous one, and according to this truncation data set, the rate control circuit 220 calculates again the amount of codes after code truncation.

In this way, the rate control circuit 220 determines the truncation data set that results in a calculated amount of codes approximately equal to the target value. The rate control circuit 220 outputs the determined truncation data set to the packet information generation circuit 34.

Based on the truncation data set input through the DMA 31, the address generation circuit 230 generates an address signal for reading out the amount of codes after truncating codes in each sub-band, and outputs the address signal to the memory C or memory D.

The address generation circuit 230 outputs the data indicating the amount of codes after code truncation loaded at the specified address in either the memory C or the memory D, which is in an enabled state and holds data of the image frame being processed, are output to the code amount calculation circuit 240.

The address generation circuit 230 includes a register 231, a selector 232, a sub-band selection circuit 233, a selector 234, a multiplier 235, and an accumulator 236.

The truncation data set that is output through the DMA 31 are input to the register 231. The register 231 holds the truncation data set with the truncation data set being divided into parts related to the sub-bands, respectively, (that is, the sub-bands 3LL, 3HL, 3LH, 3HH, 2HL, 2LH, 2HH, 1HL, 1LH, and 1HH), and outputs the divided truncation data set to the selector 232.

In response to a selection signal from the sub-band selection circuit 233, the selector 232 sequentially outputs the truncation data sets of all the sub-bands to one input terminal of the multiplier 235 in order of sub-band 3LL, 3HL, 3LH, 3HH, 2HL, 2LH, 2HH, 1HL, 1LH, and 1HH. The value of the offset address $ADD_{OFF}$ is input to the other input terminal of the multiplier 235.

The multiplier 235 outputs the offset address, which corresponds to the number of the coding passes to be truncated as specified by the truncation data of the sub-band selected by the selection signal, to one input terminal of the accumulator 236.

The sub-band selection circuit 233 updates the selection signal so as to select the next sub-band in synchronization with a clock signal CLK, which is input as a request signal for the selection signal.

The selection signal from the sub-band selection circuit 233 is also input to the selector 234.

The selector 234 outputs a heading address ADD (ADD3LL through ADD1HH) of the sub-band determined by the selection signal to the other input terminal of the accumulator 236.

Due to the above configuration, the accumulator 236 generates an address for storing the data indicting the amount of the residual codes which is obtained after truncating, from the bit-plane of the least significant bit, codes of coding passes specified by the truncation data set of the sub-band selected by the selection signal and codes of an additional number of coding passes equaling to the number of masks. The accumulator 236 then outputs the address data to the memory C or memory D.

The code amount calculation circuit 240 includes an accumulator 241, a register 242, a register 243, an AND gate 244, and a comparator 255.

The code amount calculation circuit 240 calculates the total amount of codes after code truncation of all the sub-bands using the amounts of codes after code truncation in each sub-band sent from the memory C or the memory D. The code amount calculation circuit 240 compares the obtained total amount of codes with a target value, generates a signal indicating the comparison result and outputs the signal to the data number switching circuit 250.

The data of the amount of codes read out by the code amount calculation circuit 240 from the memory C or the memory D is input to one input terminal of the accumulator 241. The data loaded in the register 242, which is the output of the accumulator 241, is input to the other input terminal of the accumulator 241. By such a configuration, the sum of the amounts of codes in each sub-band, which are read out from the memory C and the memory D, is loaded in the register 242 until a reset signal is input to the register 242.

The sub-band selection circuit 233 in the address generation circuit 230 outputs the selection signal to one input terminal of the AND gate 244. The other input terminal of the AND gate 84 is connected to the register 243.

The register 243 loads data having the same value as that of the selection signal output after the 1HH sub-band is selected, that is, after all sub-bands are selected, and before the first sub-band, that is, the 3LL sub-band, is selected again.

Due to this configuration, after selection signals of all the sub-bands are output, and before the 3LL sub-band is selected again, the AND gate 244 outputs a high level enabling signal to the enabling terminal of the comparator 245 to switch the comparator 245 to an enabling state.

The comparator 245 compares the amount of codes after code truncation from the register 242 with a target value, generates a signal indicating the comparison result, and outputs the signal to the data number switching circuit 250.

The data number switching circuit 250 has the same configuration as the data number switching circuit 90 of the image compression device in the first embodiment, and the detailed explanation is omitted.

Third Embodiment

Figure 17:
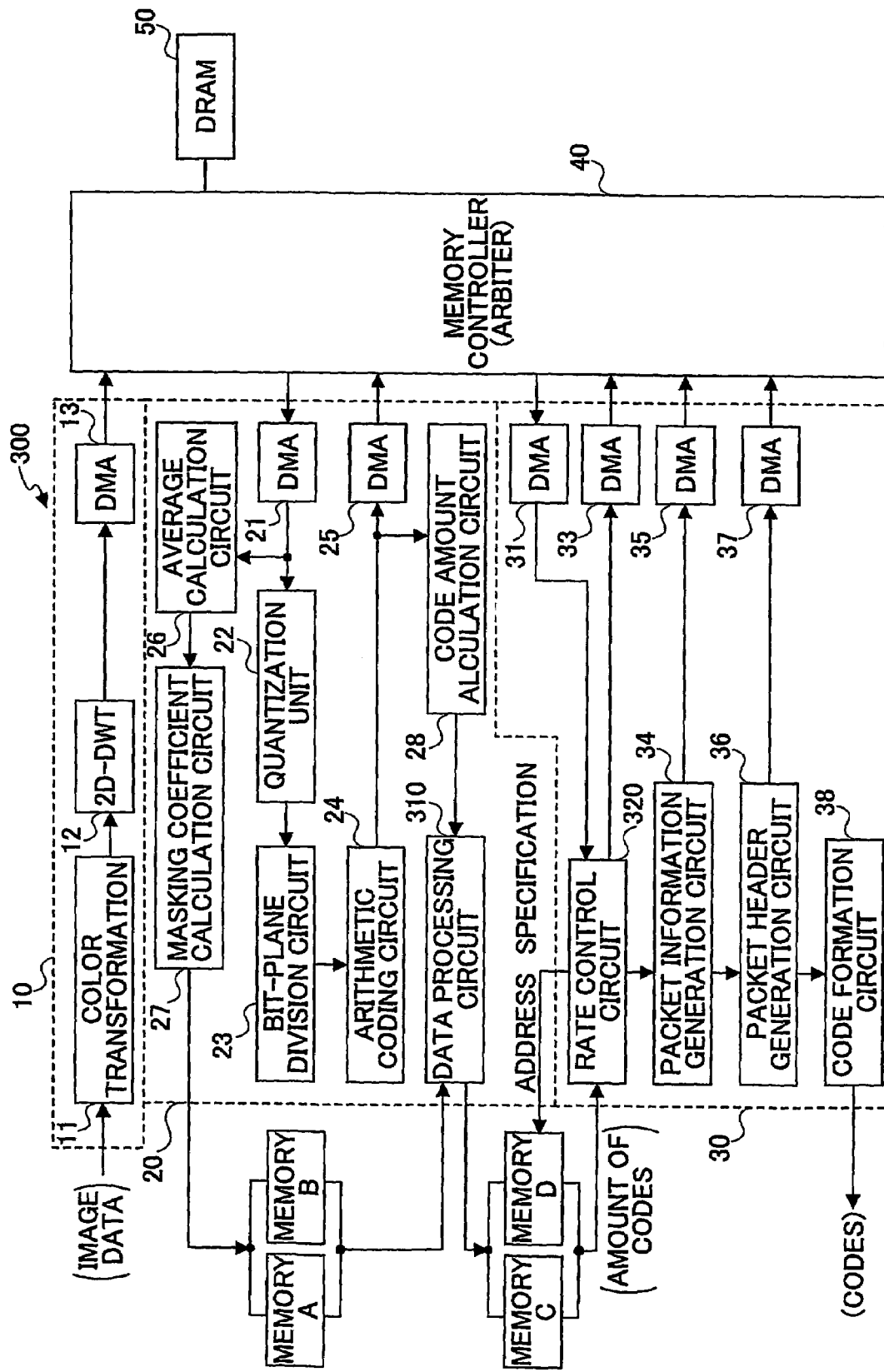
FIG. 17 is a block diagram showing a configuration of an image compression device 300 according to a third embodiment of the present invention.

FIG. 17 is a block diagram showing a configuration of an image compression device 300 according to a third embodiment of the present invention.

Similar to the image compression device 100 and the image compression device 200 in the previous embodiments, the image compression device 300 calculates the number of masks of each code block in each sub-band and amount of codes of each coding pass of each code block, and the amount of codes to be truncated for all the sub-bands when truncating coding passes in each sub-band one by one based on a truncation data set. By comparing the obtained amount of codes to be truncated and a target value, the image compression device 300 determines the most appropriate truncation data set.

In the first embodiment, in order to calculate the amount of codes to be truncated for all the sub-bands, the image compression device 100 calculates the change of the amount of codes, that is, the amount of codes to be truncated when truncating the codes of the coding passes of code blocks in each sub-band from the bit-plane of the least significant bit coding pass by coding pass, and loads the result of the change of the amount of codes in the memory C or the memory D in advance.

In contrast, in the present embodiment, in order to calculate the amount of codes to be truncated for all the sub-bands, when truncating codes of the coding passes of code blocks in each sub-band from the bit-plane of the least significant bit coding pass by coding pass, the image compression device 300 calculates the amount of codes to be truncated when truncating codes of one coding pass, the amount of codes to be truncated when truncating codes of two coding passes, . . . , the amount of codes to be truncated when truncating codes of 46 coding passes, respectively, and loads these results in the memory C or the memory D in advance. Here, the amount of codes to be truncated when truncating codes of one coding pass is actually the change of the amount of codes when truncating codes of one coding pass, and the amount of codes to be truncated when truncating codes of two coding pass is defined to be the sum of the change of the amount of codes when truncating codes of the first coding pass and the change of the amount of codes when truncating codes of the second coding pass.

The configuration of the image compression device 200 is basically the same as those of the image compression device 100 and the image compression device 200, except that the data processing circuit 310 of the arithmetic coding unit 20 and the rate control circuit 220 of the packet header generation unit 330 in the present embodiment are different from those in the previous embodiments.

Below, only the data processing circuit 310 and the rate control circuit 320 are described in detail, and the same reference numbers are used for the same elements in the present embodiment as those in the preceding embodiment.

Figure 18:
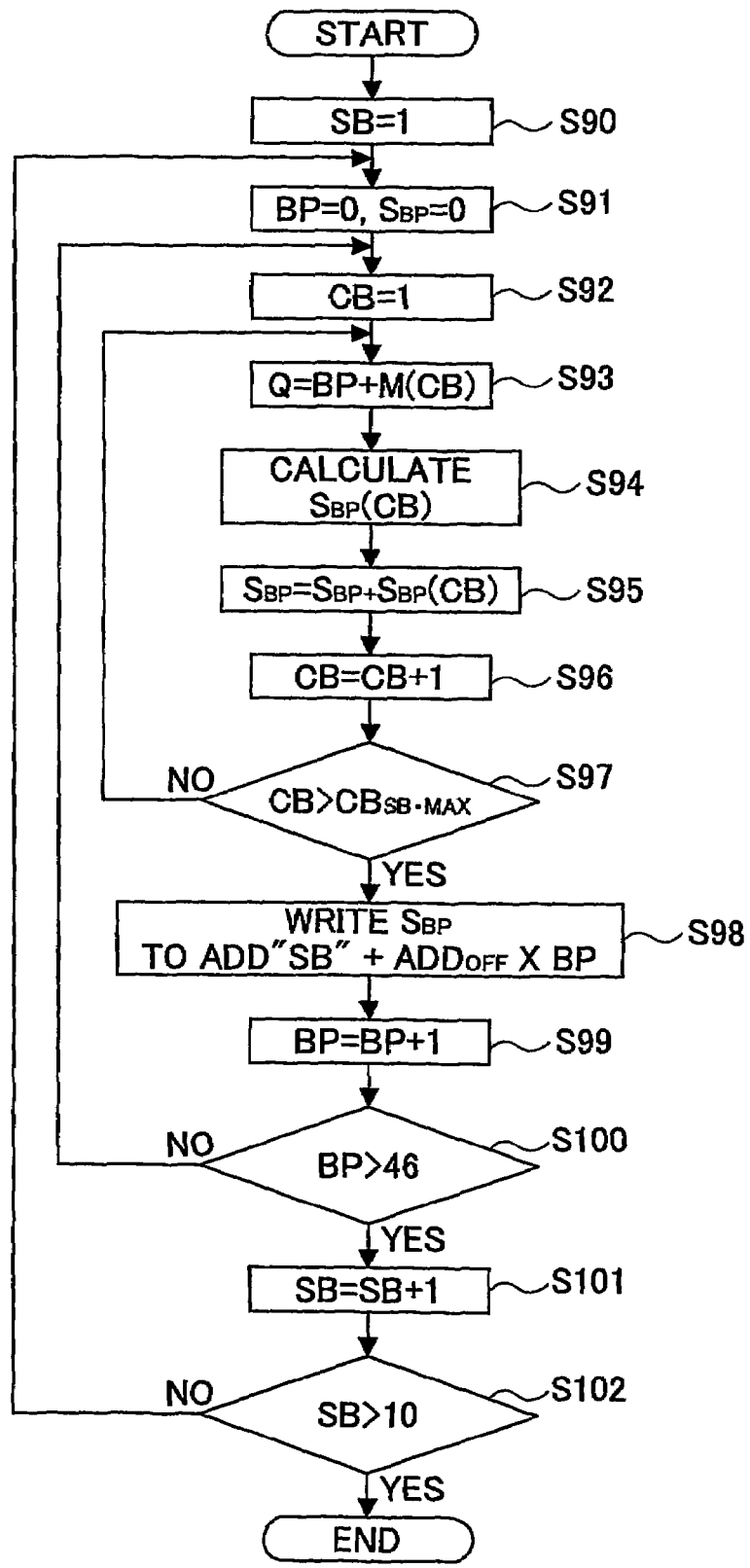
FIG. 18 is a flowchart showing the operation of the data processing circuit 310 of the image compression device 300 according to the third embodiment of the present invention.

FIG. 18 is a flowchart showing the operation of the data processing circuit 310. Here, if the flowchart shown in FIG. 18 is input to the logic synthesis tool made by the company Synopsys, USA, a specific circuit can be automatically designed.

First, sub-bands are defined corresponding to values of the sub-band determining parameter SB. Specifically, SB=1 corresponds to the sub-band 3LL, SB=2 corresponds to the sub-band 3HL, SB=3 corresponds to the sub-band 3LH, SB=4 corresponds to the sub-band 3HH, SB=5 corresponds to the sub-band 2HL, SB=6 corresponds to the sub-band 2LH, SB=7 corresponds to the sub-band 2HH, SB=8 corresponds to the sub-band 1HL, SB=9 corresponds to the sub-band 1LH, and SB=10 corresponds to the sub-band 1HH.

As shown in FIG. 18, in step S90, the data processing circuit 310 sets the parameter SB equal to one.

In step S91, the data processing circuit 310 sets a parameter BP equal to zero, and a variable $S_{BP}$ equal to zero. The parameter BP determines the number of the coding passes, codes in which are to be truncated.

The variable $S_{BP}$ indicates the total amount of the truncated codes when codes of a number of BP coding passes of the target code block are truncated coding pass by coding pass from the bit-plane of the least significant bit.

In step S92, the data processing circuit 310 sets a parameter CB equal to one. The parameter CB determines one of code blocks of the sub-band specified by the parameter SB, to which consecutive numbers 1, 2, 3, . . . are assigned.

In step S93, the data processing circuit 310 sets a parameter Q to a value equaling the sum of the parameter BP and the number of masks M(CB) to be truncated in the code block specified by the parameter CB. The parameter Q indicates the number of the coding passes, codes in which are to be truncated in the code block.

In step S94, from data stored in the memory A or the memory B, the data processing circuit 310 calculates the total amount of codes (represented by $S_{BP}(CB)$) of a number of Q coding passes from the bit-plane of the least significant bit of the code block specified by the parameter CB.

In step S95, the data processing circuit 310 assigns the sum of the value of the variable $S_{BP}(CB)$ and the value of the parameter $S_{BP}$ to the parameter $S_{BP}$.

In step S96, the data processing circuit 310 increments the parameter CB by one.

In step S97, the data processing circuit 310 determines whether the parameter CB is greater than the maximum number $CB_{SB-MAX}$ assigned to the code blocks of the sub-band specified by the parameter SB.

If the parameter CB is not greater than the maximum number $CB_{SB-MAX}$, the data processing circuit 310 goes back to step S93. If the parameter CB is greater than the maximum number $CB_{SB-MAX}$, the data processing circuit 310 goes to step S98.

In step S98, the data processing circuit 310 stores the value of the parameter $S_{BP}$ to an address equaling the sum of an offset address $ADD_{OFF} \times BP$ and an address ADD"SB" in the memory selected from the memory A and the memory B, which are alternatively switched to the enabled state frame by frame.

For example, when the parameter SB is one, the address ADD"SB" represents the address ADD3LL.

In step S99, the data processing circuit 310 increments the parameter BP by one.

In step S100, the data processing circuit 310 determines whether the parameter BP is greater than 46. If the parameter BP is not greater than 46, the data processing circuit 310 goes back to step S92.

If the parameter BP is greater than 46, that is, all of the 46 coding passes of the sub-band specified by the parameter BP have been processed, the data processing circuit 310 goes to step S101 to process the next sub-band.

In step S101, in order to process the next sub-band, the data processing circuit 310 increments the parameter SB by one.

In step S102, the data processing circuit 310 determines whether the parameter SB is greater than 10, which is the maximum of the parameter SB as defined above.

If the value of the parameter SB is not greater than 10, the data processing circuit 310 returns to step S91.

If the value of the parameter SB is greater than 10, it means that all of the sub-bands have been processed, and the data processing circuit 310 stops the routine.

The operations shown by the flowchart in FIG. 18 can be performed by software executed in a not-illustrated central processing unit.

FIG. 19 is a block diagram showing a configuration of the rate control circuit 320 of the image compression device 300 according to the third embodiment of the present invention.

As shown in FIG. 19, the rate control circuit 320 includes an address generation circuit 230, a code amount calculation circuit 340, and a data number switching circuit 250.

In the rate control circuit 320, only the code amount calculation circuit 340 is different from the code amount calculation circuit 240 in the previous embodiments.

In the second embodiment, a target amount of codes is input to the comparator 245, but in the present embodiment, a target amount of truncated data is input to the comparator 345. This is because the data loaded in the memory C or the memory D are the amounts of truncated codes when truncating codes of one coding pass, two coding passes, . . . , and 46 coding passes, respectively, and the register 242 loads the sum of amounts of the truncated codes in each sub-band.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, each of the first units is further divided into a number of second units, and according to values of the coefficients of each of the second units, data truncation is performed second unit by second unit. Due to this, in comparison with the case in which codes are truncated in a single and large unit, that is, the first unit, it is possible to improve the compression rate while maintaining quality of the reproduced image.

By preparing truncation data sets arranged so that along with an increase of the data numbers of the truncation data sets, the amount of the codes to be truncated increases or decreases gradually, and the image quality degrades or improves gradually, it is not necessary to perform the process of decoding the codes after truncation according to the JPEG 2000 algorithm and determine distortion relative to the image prior to the code truncation, to determine the way of code truncation resulting in the least distortion.

This patent application is based on Japanese Priority Patent Application No. 2003-091307 filed on Mar. 28, 2003, the entire contents of which are hereby incorporated by reference.

The invention claimed is:

1. An image compression device, comprising:
   an encoding part configured to perform a frequency analysis of image data, encodes a plurality of coefficients generated by the frequency analysis first unit by first unit, and generates a plurality of codes;
   a code reduction part configured to reduce an amount of the codes of each of the first units; and
   a processing part configured to further divide the coefficients or the codes in each of the first units into a plurality of second units, each of the second units including plural codes, and increase the amount of code reduction in the code reduction part for each of the second units according to values of the coefficients or the codes of each of the second units.

2. The image compression device as claimed in claim 1, wherein:
   the code reduction part comprises:
   a truncation table including a plurality of truncation data sets to each of which a data number is assigned, said truncation data sets determining the amount of the codes to be truncated from the codes corresponding to one of the coefficients from the lean significant bit or the codes in each of the first units, said truncation data sets being arranged so tat along with an increase of the data number, the amount of the codes to be truncated increases or decreases gradually, and the image quality degrades or improves gradually; and
   a rate controller that determines one of the data numbers corresponding to one of the truncation data sets, said one of the truncation data sets resulting in a change of the amount of the codes of each of the first units after code truncation in accordance with the one of the truncation data sets to be close to a target value.

3. An image compression device comprising:
   an encoding part performs configured to perform a two-dimensional discrete wavelet transformation on image data and generate a plurality of wavelet coefficients, divide the wavelet coefficients into a plurality of sub-bands, performs perform arithmetic coding for the wavelet coefficients of each of the sub-bands and generate a plurality of codes;
   a code reduction part configured to reduce an amount of the codes by truncating a portion of the codes corresponding to one of the wavelet coefficients from the least significant bit of the codes in each of the sub-bands; and
   a processing part configured to divide each of the sub-bands into a plurality of code blocks, and increase the amount of codes to be truncated in the code reduction part for each of the code blocks according to values of the wavelet coefficients in each of the code blocks or according to values of data obtained by processing the wavelet coefficients of each of the code blocks.

4. The image compression device as claimed in claim 3, wherein:
   the processing part comprises:
   an average value calculation circuit that calculates an average value of the wavelet coefficients of a plurality of effective pixels in each of the code blocks, or an average value of the data obtained by processing the wavelet coefficients of the effective pixels in each of the code blocks; and a masking coefficient calculation circuit that determines the increase of the amount of the codes to be truncated in each of the code blocks performed in the code reduction part according to the average value obtained in the average value calculation circuit.

5. The image compression device as claimed in claim 4, wherein:

the average value calculation circuit quantizes the wavelet coefficients of the effective pixels in each of the code blocks, and calculates the average value of the data obtained by quantizing the wavelet coefficients.

6. The image compression device as claimed in claim 4, wherein:

the average value calculation circuit encodes the wavelet coefficients of the effective pixels in each of the code blocks by the arithmetic coding, and calculates the average value of the data obtained by encoding the wavelet coefficients.

7. An image compression method, comprising:

a first step of performing a frequency analysis on image data, encoding a plurality of coefficients obtained by the frequency analysis first unit by first unit, and generating a plurality of codes;

a second step of reducing an amount of the codes of each of the first units; and a third step of further dividing the coefficients or the codes of each of the first units into a plurality of second units, each of the second units including plural codes, and increasing the amount of code reduction for each of the second units according to values of the coefficients or the codes of each of the second units.

8. The image compression method as claimed in claim 7, wherein:

the second step comprises:

a step of creating a truncation table including a plurality of truncation data sets to each of which a data number is assigned; said truncation data sets determining the amount of the codes to be truncated from the codes corresponding to one of the coefficients from the least significant bit of the codes in each of the first units, said truncation data sets being arranged so that along with an increase of the data number, the amount of the codes to be truncated increases or decreases gradually, and the image quality degrades or improves gradually; and a step of determining one of the data numbers corresponding to one of the truncation data sets, said one of the truncation data sets resulting in a change of the amount of the codes of each of the first units after code truncation in accordance with the one of the truncation data sets to be close to a target value.

9. An image compression method, comprising:

a first step of performing a two-dimensional discrete wavelet transformation on image data and generating a plurality of wavelet coefficients, dividing the wavelet coefficients into a plurality of sub-bands, performing arithmetic coding for the wavelet coefficients of each of the sub-bands and generating a plurality of codes;

a second step of reducing an amount of the codes by truncating a portion of the codes corresponding to one of the wavelet coefficients from the least significant bit of the codes in each of the sub-bands; and a third step of dividing each of the sub-bands into a plurality of code blocks, and increasing the amount of codes to be truncated for each of the code blocks according to values of the wavelet coefficients in each of the code blocks or according to values of data obtained by processing the wavelet coefficients of each of the code blocks.

10. The image compression method as claimed in claim 9, wherein:

the third step comprises:

a fourth step of calculating an average value of the wavelet coefficients of a plurality of effective pixels in each of the code blocks, or an average value of the data obtained by processing the wavelet coefficients of the effective pixels in each of the code blocks; and a fifth step of determining the increase of the amount of the codes to be truncated in each of the code blocks performed in the code reduction part according to the average value obtained in the average value calculation circuit.

11. The image compression method as claimed in claim 10, wherein:

the fourth step comprises a step of quantizing the wavelet coefficients of the effective pixels in each of the code blocks, and calculating the average value of the data obtained by quantizing the wavelet coefficients.

12. The image compression method as claimed in claim 10, wherein:

the fourth step comprises a step of encoding the wavelet coefficients of the effective pixels in each of the code blocks by the arithmetic coding, and calculating the average value of the data obtained by encoding the wavelet coefficients.

13. A computer readable medium embodying a program of instructions executable by a computer to perform a method for compressing image data, said method comprising:

a first step of performing a frequency analysis on image data, encoding a plurality of coefficients obtained by the frequency analysis first unit by first unit, and generating a plurality of codes;

a second step of reducing an amount of the codes of each of the first units; and a third step of further dividing the coefficients or the codes of each of the first units into a plurality of second units, each of the second units including plural codes, and increasing the amount of code reduction for each of the second units according to values of the coefficients or the codes of each of the second units.

14. The computer readable medium as claimed in claim 13, wherein:

the second step comprises:

a step of creating a truncation table including a plurality of truncation data sets to each of which a data number is assigned, said truncation data sets determining the amount of the codes to be truncated from the codes corresponding to one of the coefficients from the least significant bit of the codes in each of the first units, said truncation data sets being arranged so that along with an increase of the data number, the amount of the codes to be truncated increases or decreases gradually, and the image quality degrades or improves gradually; and a step of determining one of the data numbers corresponding to one of the truncation data sets, said one of the truncation data sets resulting in a change of the amount of the codes of each of the first units after code truncation in accordance with the one of the truncation data sets to be close to a target value.

15. A computer readable medium embodying a program of instructions executable by a computer to perform a method for compressing image data, said method comprising:

a first step of performing a two-dimensional discrete wavelet transformation on image data and generating a plurality of wavelet coefficients, dividing the wavelet coefficients into a plurality of sub-bands, performing arithmetic coding for the wavelet coefficients of each of the sub-bands and generating a plurality of codes;

a second step of reducing an amount of the codes by truncating a portion of the codes corresponding to one of the wavelet coefficients from the least significant bit of the codes in each of the sub-bands; and a third step of dividing each of the sub-bands into a plurality of code blocks, and increasing die amount of codes to be truncated for each of the code blocks according to values of the wavelet coefficients in each of the code blocks or according to values of data obtained by processing the wavelet coefficients of each of the code blocks.

16. The computer readable medium as claimed in claim 15, wherein:

the third step comprises:

a fourth step of calculating an average value of the wavelet coefficients of a plurality of effective pixels in each of the code blocks, or an average value of the data obtained by processing the wavelet coefficients of the effective pixels in each of the code blocks; and a fifth step of determining the increase of the amount of the codes to be truncated in each of the code blocks performed in the code reduction part according to the average value obtained in the average value calculation circuit.

17. The computer readable medium as claimed in claim 16, wherein:

the fourth step comprises a step of quantizing the wavelet coefficients of the effective pixels in each of the code blocks, and calculating the average value of the data obtained by quantizing the wavelet coefficients.

18. The computer readable medium as claimed in claim 16, wherein:

the fourth step further comprises a step of encoding the wavelet coefficients of the effective pixels in each of the code blocks by the arithmetic coding, and calculating the average value of the data obtained by encoding the wavelet coefficients.

19. A computer readable storage medium that stores a program of instructions executable by a computer to perform a method for compressing image data, said method comprising:

a first step of performing a frequency analysis on image data, encoding a plurality of coefficients obtained by the frequency analysis first unit by first unit, and generating a plurality of codes;

a second step of reducing an amount of the codes of each of the first units; and a third step of further dividing the coefficients or the codes of each of the first units into a plurality of second units, each of the second units including plural codes, and increasing the amount of code reduction for each of the second units according to values of the coefficients or the codes of each of the second units.

20. The computer readable storage medium as claimed in claim 19, wherein:

the second step comprises:

a step of creating a truncation table including a plurality of truncation data sets to each of which a data number is assigned, said truncation data sets determining the amount of the codes to be truncated from the codes corresponding to one of the coefficients from the least significant bit of the codes in each of the first units, said truncation data sets being arranged so that along with an increase of the data number, the amount of the codes to be truncated increases or decreases gradually, and the image quality degrades or improves gradually; and a step of determining one of the data numbers corresponding to one of the truncation data sets, said one of the truncation data sets resulting in a change of the amount of the codes of each of the first units after code truncation in accordance with the one of the truncation data sets to be close to a target value.

21. A computer readable storage medium that stores a program of instructions executable by a computer to perform a method for compressing image data, said method comprising:

a first step of performing a two-dimensional discrete wavelet transformation on image data and generating a plurality of wavelet coefficients, dividing the wavelet coefficients into a plurality of sub-bands, performing arithmetic coding for the wavelet coefficients of each of the sub-bands and generating a plurality of codes;

a second step of reducing an amount of the codes by truncating a portion of the codes corresponding to one of the wavelet coefficients from the least significant bit of the codes in each of the sub-bands; and a third step of dividing each of the sub-bands into a plurality of code blocks, and increasing the amount of codes to be truncated for each of the code blocks according to values of the wavelet coefficients in each of the code blocks or according to values of data obtained by processing the wavelet coefficients of each of the code blocks.

22. The computer readable storage medium as claimed in claim 21, wherein:

the third step comprises;

a fourth step of calculating an average value of the wavelet coefficients of a plurality of effective pixels in each of the code blocks, or an average value of the data obtained by processing the wavelet coefficients of the effective pixels in each of the code blocks; and a fifth step of determining the increase of the amount of the codes to be truncated in each of the code blocks performed in the code reduction part according to the average value obtained in the average value calculation circuit.

23. The computer readable storage medium as claimed in claim 22, wherein:

the fourth step comprises a step of quantizing the wavelet coefficients of the effective pixels in each of the code blocks, and calculating the average value of the data obtained by quantizing the wavelet coefficients.

24. The computer readable storage medium as claimed in claim 16, wherein:

the fourth step further comprises a step of encoding the wavelet coefficients of the effective pixels in each of the code blocks by the arithmetic coding, and calculating the average value of the data obtained by encoding the wavelet coefficients.

* * * * *